(12) United States Patent
Kovall et al.

(10) Patent No.: US 12,449,620 B2
(45) Date of Patent: Oct. 21, 2025

(54) STRUCTURE AND METHOD TO REMOVE SEMICONDUCTOR CHIP MATERIAL FOR OPTICAL SIGNAL ACCESS TO A PHOTONIC CHIP

(71) Applicant: PsiQuantum, Corp., Palo Alto, CA (US)

(72) Inventors: George A. Kovall, Campbell, CA (US); Takashi Orimoto, Cupertino, CA (US); Gabriel Mendoza, San Francisco, CA (US); Vimal Kamineni, Mechanicville, NY (US); Himani Kamineni, Mechanicville, NY (US); Luu Nguyen, San Jose, CA (US)

(73) Assignee: PsiQuantum, Corp., Palo Alto, CA (US)

( * ) Notice: Subject to any disclaimer, the term of this patent is extended or adjusted under 35 U.S.C. 154(b) by 357 days.

(21) Appl. No.: 18/252,290

(22) PCT Filed: Nov. 9, 2021

(86) PCT No.: PCT/US2021/058670
§ 371 (c)(1),
(2) Date: May 9, 2023

(87) PCT Pub. No.: WO2022/099211
PCT Pub. Date: May 12, 2022

(65) Prior Publication Data
US 2023/0418011 A1 Dec. 28, 2023

Related U.S. Application Data

(60) Provisional application No. 63/111,542, filed on Nov. 9, 2020.

(51) Int. Cl.
*G02B 6/43* (2006.01)
*G02B 6/42* (2006.01)

(52) U.S. Cl.
CPC ............. *G02B 6/43* (2013.01); *G02B 6/4215* (2013.01); *G02B 6/4283* (2013.01); *G02B 6/4293* (2013.01)

(58) Field of Classification Search
CPC ...... G02B 6/43; G02B 6/4215; G02B 6/4283; G02B 6/4293; G02B 6/12004;
(Continued)

(56) References Cited

U.S. PATENT DOCUMENTS 10,267,988 B2 * 4/2019 Huang ..................... G02B 6/13
10,698,156 B2 6/2020 Coolbaugh et al.
(Continued)

FOREIGN PATENT DOCUMENTS

EP 4241122 A1 9/2023
WO WO-2022099211 A1 5/2022

OTHER PUBLICATIONS

EP Extended European Search report dated Sep. 19, 2024 in EP Application No. 21890297.1.
(Continued)

*Primary Examiner* — John Bedtelyon
(74) *Attorney, Agent, or Firm* — Schwegman Lundberg & Woessner, P.A.

(57) ABSTRACT

A device includes a photonic integrated circuit (PIC) die and an electronic integrated circuit (EIC) die bonded to the PIC die. The PIC die includes a waveguide layer including a waveguide and a grating coupler configured to couple incident light into the waveguide, and a first set of dielectric layers on the waveguide layer. The EIC die includes a semiconductor substrate and a second set of dielectric layers on the semiconductor substrate. The first set of dielectric layers faces the second set of dielectric layers. The PIC die and the EIC die include a trench aligned with the grating coupler, the trench extending through the semiconductor
(Continued)

substrate, the second set of dielectric layers, and the first set of dielectric layers to the waveguide layer such that the incident light may pass through the trench to reach the grating coupler. A multi-step dry etching process is used to form the trench.

28 Claims, 14 Drawing Sheets

(58) Field of Classification Search
CPC ........ G02B 6/122; G02B 6/34; G02B 6/4266; G02B 6/4274; G02B 6/4292; G02B 6/30
See application file for complete search history.

(56) References Cited

U.S. PATENT DOCUMENTS

| | | |
|---|---|---|
| 2007/0105302 A1 | 5/2007 | Birner et al. |
| 2017/0330876 A1 | 11/2017 | Leedy |
| 2018/0172728 A1 | 6/2018 | Aksyuk et al. |
| 2019/0004247 A1 | 1/2019 | Huang et al. |
| 2020/0161284 A1 | 5/2020 | Iida et al. |

OTHER PUBLICATIONS

International Search Report and Written Opinion dated Jan. 28, 2022, in PCT Application No. PCT/US2021/058670.

* cited by examiner

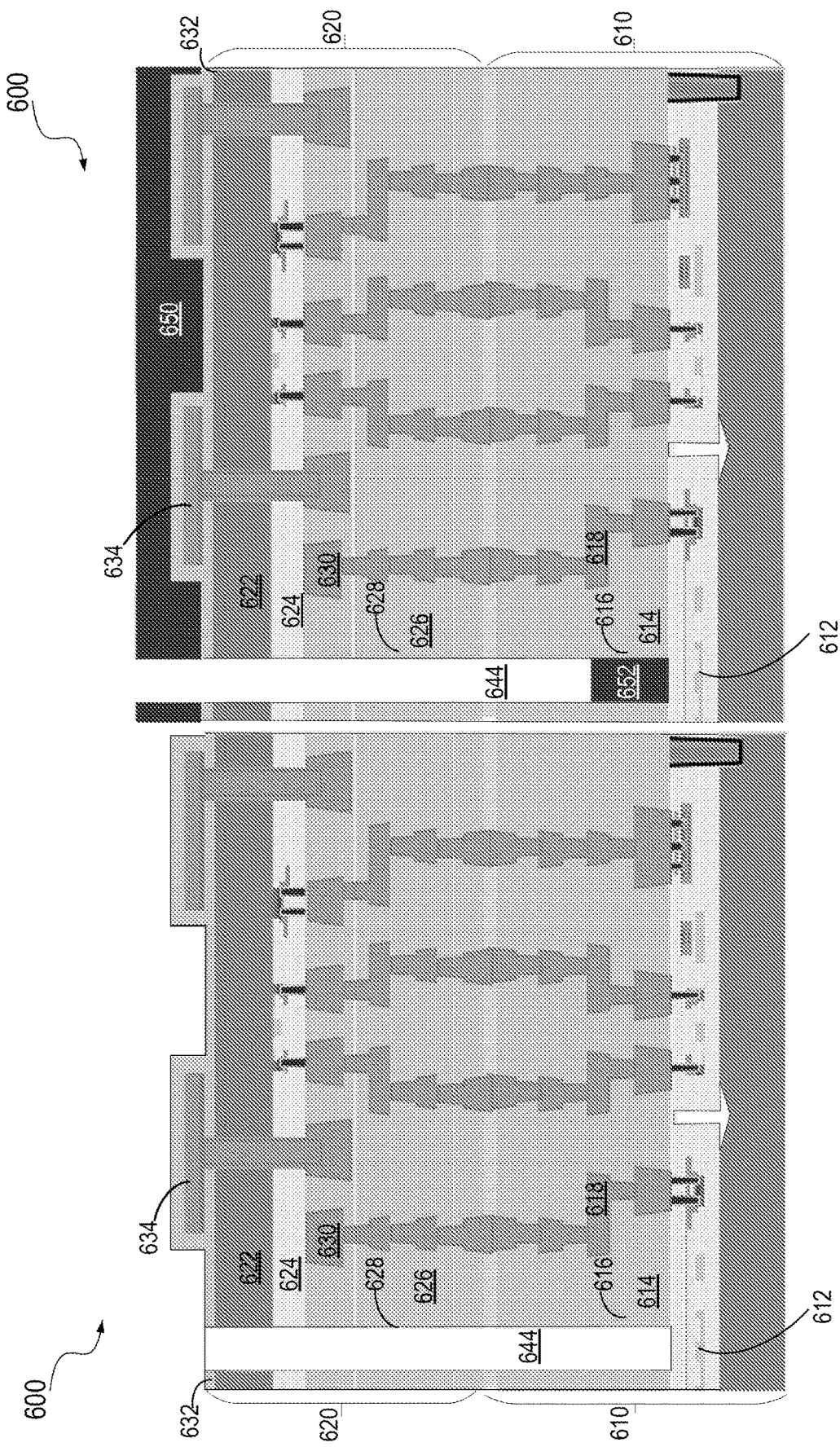

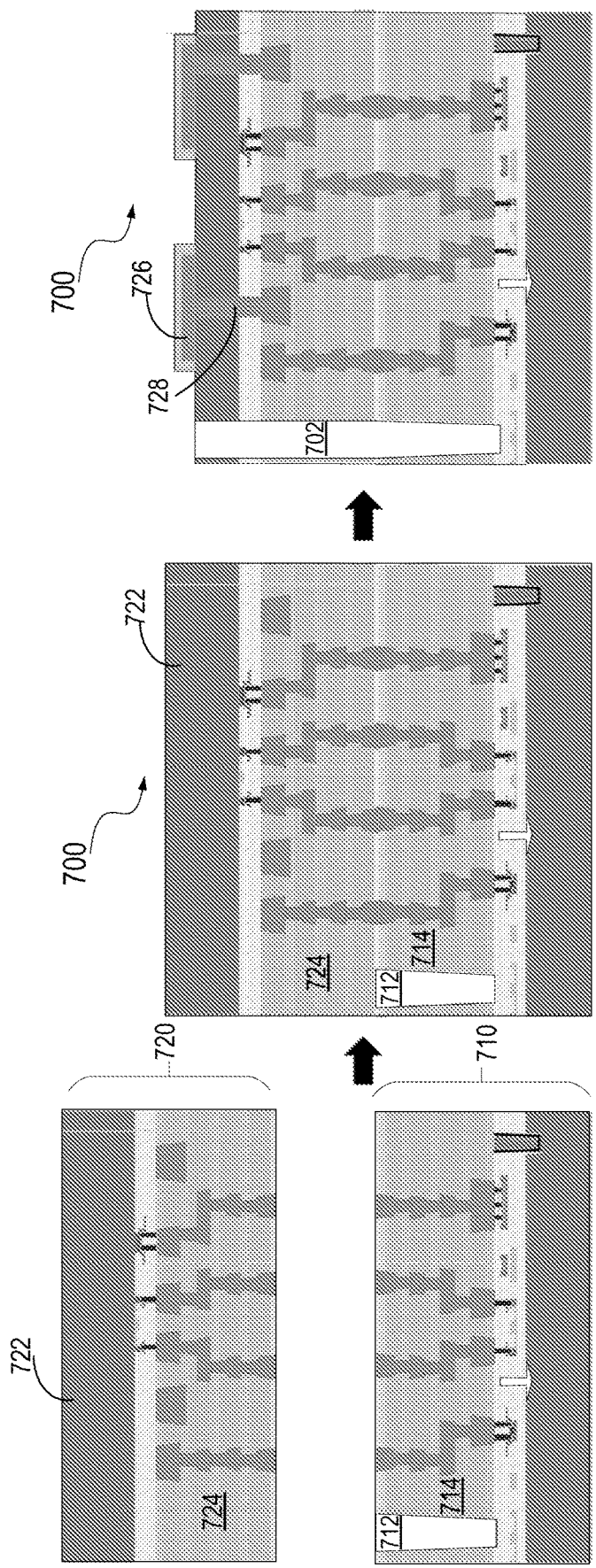

STRUCTURE AND METHOD TO REMOVE SEMICONDUCTOR CHIP MATERIAL FOR OPTICAL SIGNAL ACCESS TO A PHOTONIC CHIP

CROSS-REFERENCE TO RELATED APPLICATIONS

This patent application is a U.S. national stage entry under 35 U.S.C. § 371 of International Application No. PCT/US2021/058670, filed Nov. 9, 2021, entitled "STRUCTURE AND METHOD TO REMOVE SEMICONDUCTOR CHIP MATERIAL FOR OPTICAL SIGNAL ACCESS TO A PHOTONIC CHIP," which claims benefit of and priority to U.S. Provisional Patent Application No. 63/111,542, filed Nov. 9, 2020, entitled "STRUCTURE AND METHOD TO REMOVE SEMICONDUCTOR CHIP MATERIAL FOR OPTICAL SIGNAL ACCESS TO A PHOTONIC CHIP," the disclosures of which are assigned to the assignee hereof and are hereby incorporated by reference in their entireties for all purposes.

BACKGROUND

Photonic integrated circuits, such as silicon photonic integrated circuits, can be used in many systems, such as communication systems and optical quantum computing systems. These systems may also include many electronic integrated circuits that can be used to control the operations of the photonic integrated circuits, or to provide inputs to and/or process outputs from the photonic integrated circuits. In order to achieve a high performance (e.g., a high operating speed) and reduce the size of the system, one or more photonic integrated circuits and one or more electronic integrated circuits may be integrated into a same package by, for example, wafer-to-wafer or die-to-wafer bonding.

Techniques disclosed herein relate generally to photonic integrated circuits. More specifically, and without limitation, disclosed herein are structures and methods for removing semiconductor integrated circuit materials using semiconductor processing technology to gain optical signal access to a photonic integrated circuit in a die stack. Various inventive embodiments are described herein, including methods, processes, systems, devices, wafers, dies, packages, modules, structures, and the like.

In accordance with certain embodiments, a device may include a photonic integrated circuit (PIC) die and an electronic integrated circuit (EIC) die bonded to the PIC die. The PIC die may include a waveguide layer including a waveguide and a grating coupler configured to couple incident light into the waveguide, and a first set of dielectric layers on the waveguide layer. The EIC die may include a semiconductor substrate, and a second set of dielectric layers on the semiconductor substrate. The first set of dielectric layers may face the second set of dielectric layers. The PIC die and the EIC die may include a trench aligned with the grating coupler, the trench extending through the semiconductor substrate, the second set of dielectric layers, and the first set of dielectric layers to the waveguide layer such that the incident light may pass through the trench to reach the grating coupler.

In some embodiments, the device may include a dielectric layer on sidewalls of the trench. The trench may include a wider portion in the semiconductor substrate. The trench may be characterized by an aspect ratio between about 1:1 and about 3:1. In some embodiments, the trench may be characterized by a lateral area between one time and two times of a lateral area of the grating coupler, which may be between about 40×40 $\mu m^2$ and about 100×100 $\mu m^2$. The trench may have a depth greater than about 50 $\mu m$. In some embodiments, the device may include an optical fiber in at least a portion of the trench.

In some embodiments, the EIC die may also include a plurality of through-silicon vias (TSVs) in the semiconductor substrate, and a plurality of metal contact pads on the semiconductor substrate and facing away from the PIC die, where the plurality of metal contact pads may be coupled to the TSVs. The EIC die may also a dielectric layer between the semiconductor substrate and the plurality of metal contact pads. In some embodiments, the first set of dielectric layers may include an etch stop layer for oxide etching. In some embodiments, the second set of dielectric layers may include an etch stop layer for oxide etching.

According to certain embodiments, a method may include obtaining a wafer stack that includes a photonic integrated circuit (PIC) wafer and an electronic integrated circuit (EIC) wafer. The PIC wafer may include a waveguide layer including a waveguide and a grating coupler configured to couple incident light into the waveguide, and a first set of dielectric layers on the waveguide layer. The EIC wafer may include a semiconductor substrate, a first dielectric layer on a first side of the semiconductor substrate, and a second set of dielectric layers on a second side of the semiconductor substrate. The first set of dielectric layers may be bonded to the second set of dielectric layers to form the wafer stack. The method may also include forming a first patterned etch mask layer on the first side of the semiconductor substrate, where the first patterned etch mask layer may include a first opening aligned with the grating coupler. The method may further include etching a region of the first dielectric layer under the first opening using the first patterned etch mask layer in a first etching process, etching a region of the semiconductor substrate under the first opening using the first patterned etch mask layer in a second etching process, and etching a region of the second set of dielectric layers under the first opening using the first patterned etch mask layer in a third etching process to form a trench in the first dielectric layer, the semiconductor substrate, and the second set of dielectric layers under the first opening. In some embodiments, the semiconductor substrate may be characterized by a thickness greater than about 25 $\mu m$.

In some embodiments, the method may also include etching, using the first patterned etch mask layer in the third etching process, a region of the first set of dielectric layers under the first opening until the trench reaches an etch stop layer in the first set of dielectric layers. In some embodiments, the method may also include etching, using the first patterned etch mask layer in a fourth etching process, a region of the etch stop layer under the first opening. The etch stop layer may include a silicon nitride layer. The second etching process may be characterized by an etch selectivity between silicon and silicon dioxide greater than 20:1, such as about or greater than 50:1. In some embodiments, the second etching process may include a Bosch etching process. The first etching process, the second etching process, and the third etching process may each include, for example, a chemically assisted plasma etching process.

In some embodiments, the method may also include forming a second patterned etch mask layer on the first side of the semiconductor substrate, where the second patterned etch mask layer may include a second opening that is aligned with the grating coupler and is wider than the first opening. The method may further include etching a region of the first dielectric layer under the second opening using the second patterned etch mask layer in a fifth etching process, and etching the semiconductor substrate under the second opening using the second patterned etch mask layer in a sixth etching process. In some embodiments, the method may include conformally depositing a second dielectric layer on sidewalls of the trench.

In some embodiments, obtaining the wafer stack may include obtaining the EIC wafer and the PIC wafer, bonding the EIC wafer and the PIC wafer such that the first set of dielectric layers faces the second set of dielectric layers, thinning the semiconductor substrate, forming through-silicon vias in the semiconductor substrate, forming the first dielectric layer on the first side of the semiconductor substrate, and forming metal contact pads on the first dielectric layer. In some embodiments, the method may include, before bonding the EIC wafer and the PIC wafer, removing a region of the first set of dielectric layers on the grating coupler by etching the first set of dielectric layers.

According to certain embodiments, a method may include obtaining a wafer stack including a photonic integrated circuit (PIC) wafer and an electronic integrated circuit (EIC) wafer. The PIC wafer may include a waveguide layer including a waveguide and a grating coupler configured to couple incident light into the waveguide, a first set of dielectric layers on the waveguide layer, and a first trench in the first set of dielectric layers and aligned with the grating coupler. The EIC wafer may include a semiconductor substrate, a first dielectric layer on a first side of the semiconductor substrate, a second set of dielectric layers on a second side of the semiconductor substrate, and a second trench in the second set of dielectric layer and aligned with the first trench and the grating coupler. The first set of dielectric layers may be bonded to the second set of dielectric layers to form the wafer stack. The method may also include forming a first patterned etch mask layer on the first side of the semiconductor substrate, where the first patterned etch mask layer may include a first opening aligned with the grating coupler. The method may further include etching a region of the first dielectric layer under the first opening using the first patterned etch mask layer in a first etching process, and etching a region of the semiconductor substrate under the first opening using the first patterned etch mask layer in a second etching process.

In some embodiments, the method may also include forming a second patterned etch mask layer on the first side of the semiconductor substrate, where the second patterned etch mask layer may include a second opening that is aligned with the grating coupler and is wider than the first opening. The method may further include etching a region of the first dielectric layer under the second opening using the second patterned etch mask layer in a third etching process, and etching a region of the semiconductor substrate under the second opening using the second patterned etch mask layer in a fourth etching process.

In some embodiments, obtaining the wafer stack may include obtaining the EIC wafer and the PIC wafer, bonding the EIC wafer and the PIC wafer such that the first set of dielectric layers faces the second set of dielectric layers, thinning the semiconductor substrate, forming through-silicon vias in the semiconductor substrate, forming the first dielectric layer on the first side of the semiconductor substrate, and forming metal contact pads on the first dielectric layer. In some embodiments, the method may include, before bonding the EIC wafer and the PIC wafer, etching the first set of dielectric layers on the grating coupler to form the first trench, and etching the second set of dielectric layers to form the second trench. In some embodiments, the method may include conformally depositing a second dielectric layer on sidewalls of the first trench and the second trench.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIGS. 6A-6J illustrate examples of results after certain operations of the process for removing semiconductor integrated circuit materials in a wafer stack to gain optical signal access to the photonic integrated circuit shown in FIG. 5 according to certain embodiments FIGS. 7A-7C illustrate an example of a process for removing semiconductor integrated circuit materials in a wafer stack to gain optical signal access to a photonic integrated circuit according to certain embodiments.

Figure 1:
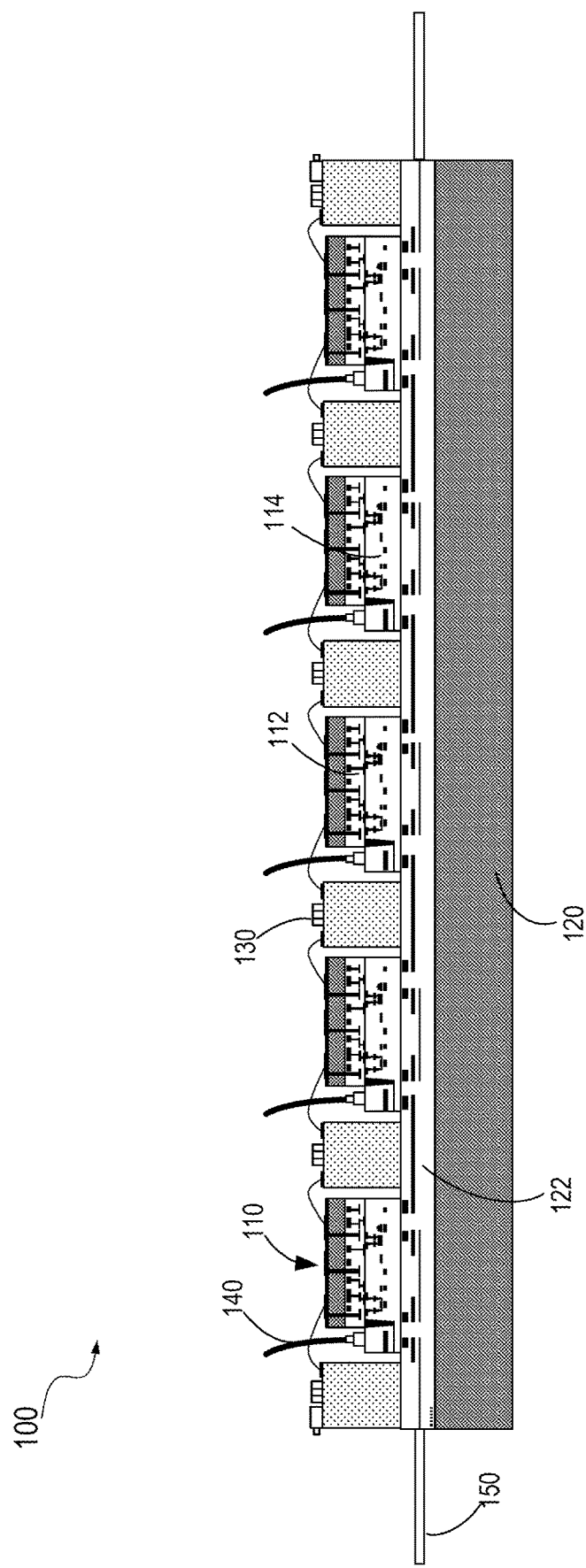
FIG. 1 is a cross-sectional view of an example of a wafer-scale package including multiple electronic integrated circuit (EIC) and photonic integrated circuit (PIC) die stacks bonded to a handle wafer according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

DETAILED DESCRIPTION

Techniques disclosed herein relate generally to photonic integrated circuits. More specifically, and without limitation, disclosed herein are structures and methods for removing semiconductor integrated circuit materials using semiconductor processing technology to gain optical signal access to a photonic integrated circuit. Various inventive embodiments are described herein, including methods, processes, systems, devices, packages, wafers, dies, modules, structures, and the like.

In some photonic integrated systems, photonic integrated circuits and electronic integrated circuits may be bonded face-to-face to directly couple pads on the photonic integrated circuits to pads on the electronic integrated circuits, thereby reducing the length of the interconnects and the size of the package and improving the performance (e.g., the speed) of the system. The package would also need to accommodate optical and electrical connections between the photonic integrated circuits and electronic integrated circuits in the package and external circuits or systems. Some examples of these optical and electrical connections may include optical fibers and ribbon cables, where grating couplers or other optical couplers may be used to couple light between the optical fibers and the photonic integrated circuits.

In a wafer stack (or die stack) that includes an electronic integrated circuit (EIC) wafer bonded to a photonic integrated circuit (PIC) wafer, the optical paths from the optical fibers to grating couplers in the PIC wafer may be blocked by the EIC wafer after the bonding. The EIC materials in the regions aligned with the grating couplers can be removed by partially dicing the wafer stack using a blade saw or using laser drilling, which may result in debris or other excess materials remaining in the opening. The debris or other excess materials in the opening would increase the optical signal loss by reflection, absorption, or scattering and thus reduce the optical coupling efficiency. In addition, dicing the wafer stack using a blade saw, laser drilling, or other mechanical destructive removal techniques may not be able to achieve uniform and precisely controlled dicing depth, and/or may even cause damages to the grating couplers.

According to certain embodiments, to improve the yield and the optical coupling efficiency, a multi-step dry etching process is used to etch trenches in selected regions of the EIC/PIC die stack such that light from optical fibers may be delivered to the grating couplers with little or no loss. The multi-step dry etching process may include a first etch step to remove oxides at selected locations on the back side of the EIC wafer that align with the grating couplers, a second etch process (e.g., a Bosch etch process) to remove the silicon substrate in the selected locations of the EIC wafer, and a third etch step (e.g., a low selectivity etching process) to remove the dielectric layers (e.g., SiO2 and SiN) of the EIC/PIC die stack at the selected regions (e.g., using a SiN layer as the etch stop layer). Optionally, a fourth etch step may be performed to create large openings in the substrate of the EIC to accommodate the optical fiber. In some embodiments, an oxide deposition step may be performed to form passivation liners on sidewalls of the etched trenches.

The multi-step dry etching process can achieve a chemical and physical removal of materials on a molecular scale, where the materials may be removed by a chemical reaction that volatilizes the material for removal in a gaseous vacuum environment, and thus would not have debris from the etch process remaining in the opening. This method can result in a more complete removal of the semiconductor integrated circuit (e.g., EIC) materials, with no remaining debris that would degrade the optical signal quality, as compared to partial dicing. As a result, the quality and consistency of the optical signal would be improved using this method. The multi-step dry etching process can also more accurately remove the semiconductor integrated circuit materials in desired regions with well-controlled etch depths, thereby improving the yield and the optical coupling efficiency between the optical fibers and the photonic integrated circuits.

Several illustrative embodiments will now be described with respect to the accompanying drawings. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 is a cross-sectional view of an example of a wafer-scale package 100 including multiple EIC/PIC (EPIC) die stacks 110 coupled to a handle wafer 120 according to certain embodiments. Wafer-scale package 100 may be used in, for example, optical quantum computers, communication systems, and other electrical-optical systems. In the illustrated example, wafer-scale package 100 includes handle wafer 120 with an optical backplane 122 formed thereon. Multiple EPIC die stacks 110 may be bonded to optical backplane 122, for example, through oxide-to-oxide bonding. In some implementations, handle wafer 120 may not include an optical backplane, and EPIC die stacks 110 may be bonded to handle wafer 120, for example, through silicon-to-silicon bonding. Each EPIC die stack 110 includes an EIC die 112 and a PIC die 114 bonded together through bonding pads or bonding bumps on the EIC die and the PIC die such that the electrical interconnects between the EIC and the PIC can be short. Electrical backplane devices 130 may also be bonded to handle wafer 120 or optical backplane 122. Optical fibers 140 may be coupled to PIC dies 114 in EPIC die stacks 110, for example, to provide pumping light or optical communication signals. In the example shown in FIG. 1, light may be coupled into or out of the photonic integrated circuits (e.g., optical waveguides) using grating couplers fabricated in PIC dies 114. Alternatively or additionally, optical fibers 150 may be coupled to optical backplane 122 through, for example, edge couplers and alignment structures (e.g., V-grooves formed on handle wafer 120). Optical fibers 150 may be used to, for example, transport optical signals between wafer-scale package 100 and other wafer-scale packages or delay or store optical signals.

Wafer-scale package 100 may include various passive and active optical components, such as waveguides, optical switches, ring oscillators, couplers, wavelength-division multiplexing beam splitter, single photon generators, single photon detectors (e.g., for detecting heralding photons), and the like. In one example, wafer-scale package 100 may deterministically generate single photons using a pump light from a pump laser. Wafer-scale package 100 may also be used to generate photonic qubits or resource states using, for example, single photon generators, waveguides, delay lines, couplers, switches, modulators, and the like. Wafer-scale package 100 may also be used to detect logic qubits using, for example, single photon detectors, waveguides, delay lines, and the like. In some embodiments, wafer-scale package 100 may include photodetectors or optical transceivers to receive and/or transmit optical communication signals, such as data and timing signals. For example, wafer-scale package 100 may include Ge photodiode-based photodetectors for receiving data and timing signals from a control unit.

One way to achieve a deterministic single-photon source is to use cascaded (or multiplexed) heralded photon sources based on, for example, spontaneous four wave mixing (SFWM) or spontaneous parametric down-conversion (SPDC) in third-order passive nonlinear optical material. In each heralded photon source (HPS), pump light may be injected into the HPS, and photons may be non-deterministically produced in pairs when two pump photons are mixed. Each pair of generated photons includes a signal photon and an idler photon. The signal photon (also referred to as the herald photon) may herald the existence of the idler photon in the pair. Thus, if a signal photon is detected at one heralded photon source, the corresponding idler photon can be used as the output of the single-photon source, while other heralded photon sources in the cascaded (or multiplexed) heralded photon sources of the single-photon source can be bypassed or switched off. A single photon generator may include single photon detectors, such as superconductive nanowire single photon detectors (SNSPD). The single photon detectors may be used to detect a herald photon that signals the generation of an idler photon in a single photon generator, or may be used to detect single photons in order to detect logic qubits. The single photon detectors are very sensitive to light and may need to operate at very low temperatures, such as cryogenic temperatures. Therefore, wafer-scale package 100 may include optical isolation structures for scatter mitigation, such that stray light in wafer-scale package 100 may not reach the single photon detectors. Wafer-scale package 100 may also include thermal isolation structures (e.g., trenches) such that heat generated in other regions would not reach regions that need to operate at low temperatures (e.g., cryogenic temperatures).

In some embodiments, PIC die 114 may include optical transceivers for communicating with, for example, a control unit. The optical transceivers may include, for example, Ge photodiode-based photodetectors for receiving high speed data signals. In some embodiments, PIC die 114 may also include heating elements, for example, for tuning some photonic integrated circuits (e.g., changing phase delays of waveguides). PIC die 114 may also include cooling structures, such as metal conductors or microfluidic channels. PIC die 114 may also include optical isolation structures, such as opaque structures surrounding the single photon detectors to prevent stray light from reaching the single photon detectors. In some embodiments, PIC die 114 may also include thermal isolation structures to isolate photonic circuits that may need to operate at low temperatures or to prevent heat loss of heating elements.

PIC dies 114 may also include other structures, such as temperature sensors, for controlling and/or improving the performance of certain photonic components. PIC die 114 may also include quantum computing circuits, such as the single photon generation circuits, resource state generation circuits, logic qubit detection circuits, and the like.

EIC dies 112 may include various electrical circuits that may control the operations of photonic integrated circuits in PIC dies 114. For example, EIC dies 112 may include circuits for controlling optical switches and heating elements, receiving or generating communication signals, data processing, and the like. Each EIC die 112 may include a silicon substrate, a plurality of transistors or other active and passive electrical components (e.g., resistor, inductors, or capacitors) fabricated on the silicon substrate, and a plurality of metal layers in dielectric layers to make electrical interconnects.

Figure 2A:
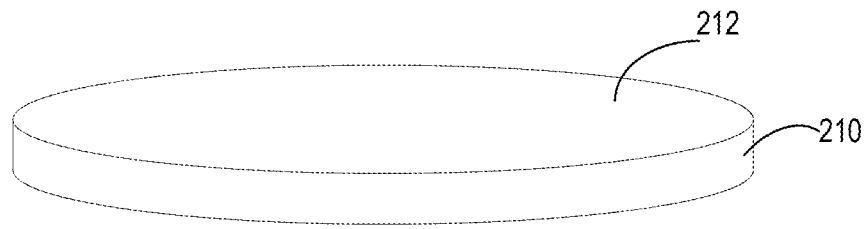
FIGS. 2A-2D illustrate an example of a process for integrating photonic integrated circuits and electronic integrated circuits in a single package according to certain embodiments.

FIGS. 2A-2D illustrate an example of a process for integrating photonic integrated circuits and electronic integrated circuits in a single package according to certain embodiments. FIG. 2A shows a PIC wafer 210 with photonic integrated circuits 212 fabricated on a semiconductor wafer, such as a silicon wafer, using semiconductor processing techniques. Photonic integrated circuits 212 may include, for example, grating couplers, waveguides, resonators, photon detectors, interferometers, gratings, photon detectors, or the like. PIC wafer 210 may include dielectric and metal pads on the top surface. In some embodiments, materials (e.g., silicon oxide or silicon nitride) on top of the grating couplers may be etched away to form openings such that light from optical fibers may pass through the openings and reach the grating couplers, which may couple the light into photonic integrated circuits 212 (e.g., silicon or silicon nitride waveguides). The grating couplers may include, for example, slanted surface relief gratings or Bragg gratings. The PICS on PIC wafer 210 may be tested to exclude defective circuits before bonding and assembly.

Figure 2B:
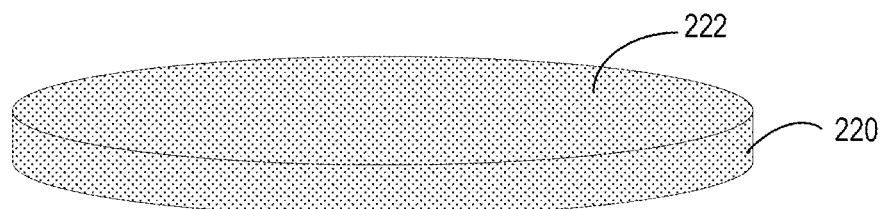

FIG. 2B shows an EIC wafer 220 with electronic integrated circuits 222 fabricated on a semiconductor wafer, such as a silicon wafer, using semiconductor processing equipment and technology (e.g., CMOS technology). The electronic integrated circuits may include, for example, control circuits, logic circuits, driver circuits, and the like. In some embodiments, through-silicon vias (TSVs) may be formed in EIC wafer 220. EIC wafer 220 may include dielectric and metal pads on the top surface. The manufactured integrated circuits on the electronic integrated circuit wafer may be tested to reject defective circuits before assembling with PIC wafer 210.

Figure 2C:
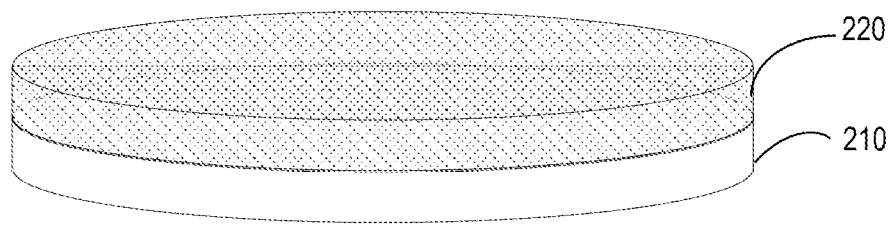

FIG. 2C shows that PIC wafer 210 and EIC wafer 220 may be aligned and bonded through wafer-to-wafer bonding to form a wafer stack. For example, one of PIC wafer 210 or EIC wafer 220 may be flipped such that the top surface of PIC wafer 210 may face the top surface of EIC wafer 220. The two wafers may be aligned to align the metal pads, and wafer-level hybrid bonding may be used to bond the top surface of PIC wafer 210 and the top surface of EIC wafer 220, where dielectric bonds and metal bonds may be formed at the interface between the two wafers.

Figure 2D:
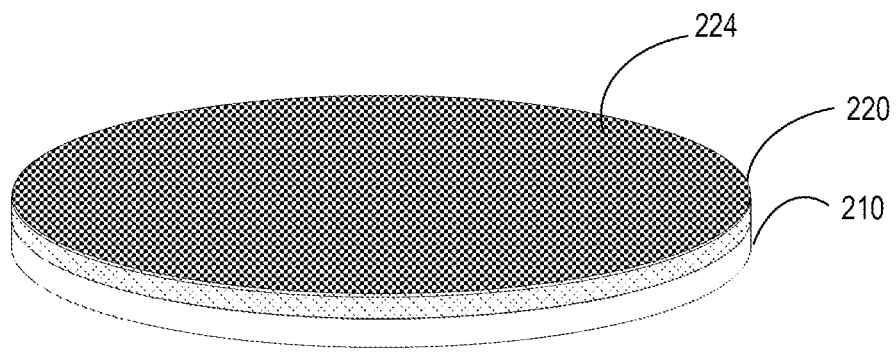

FIG. 2D shows that PIC wafer 210 and/or EIC wafer 220 may be back-grinded (or back lapped) to make the wafer stack including PIC wafer 210 and EIC wafer 220 thinner. For example, the PIC wafer may be back lapped from about 775 μm to about 100-600 μm. The EIC wafer may be back grinded from about 775 μm to about 50 μm or thinner if needed, as long as structural integrity of the EIC wafer can be maintained. In some embodiments, TSVs may be formed on EIC wafer 220 from the back surface (the silicon substrate side) of back-grinded EIC wafer 220 after the back grinding. In some embodiments, one or more redistribution layers (RDLs) may be formed on the backside of the EIC wafer, and bonding pads 224 may be formed on the redistribution layer(s). The bonding pads may be used to connect the EIC to an electrical backplane. In some embodiments, TSVs may be formed in the PIC wafer rather than the EIC wafer, and the PIC wafer may be bonded to, for example, an electronic interposer. In some embodiments, the wafer stack including PIC wafer 210 and the EIC wafer 220 may be cut by, for example, laser or plasma scribing or grinding, to separate each die area that includes a PIC die and an EIC die.

Figure 3:
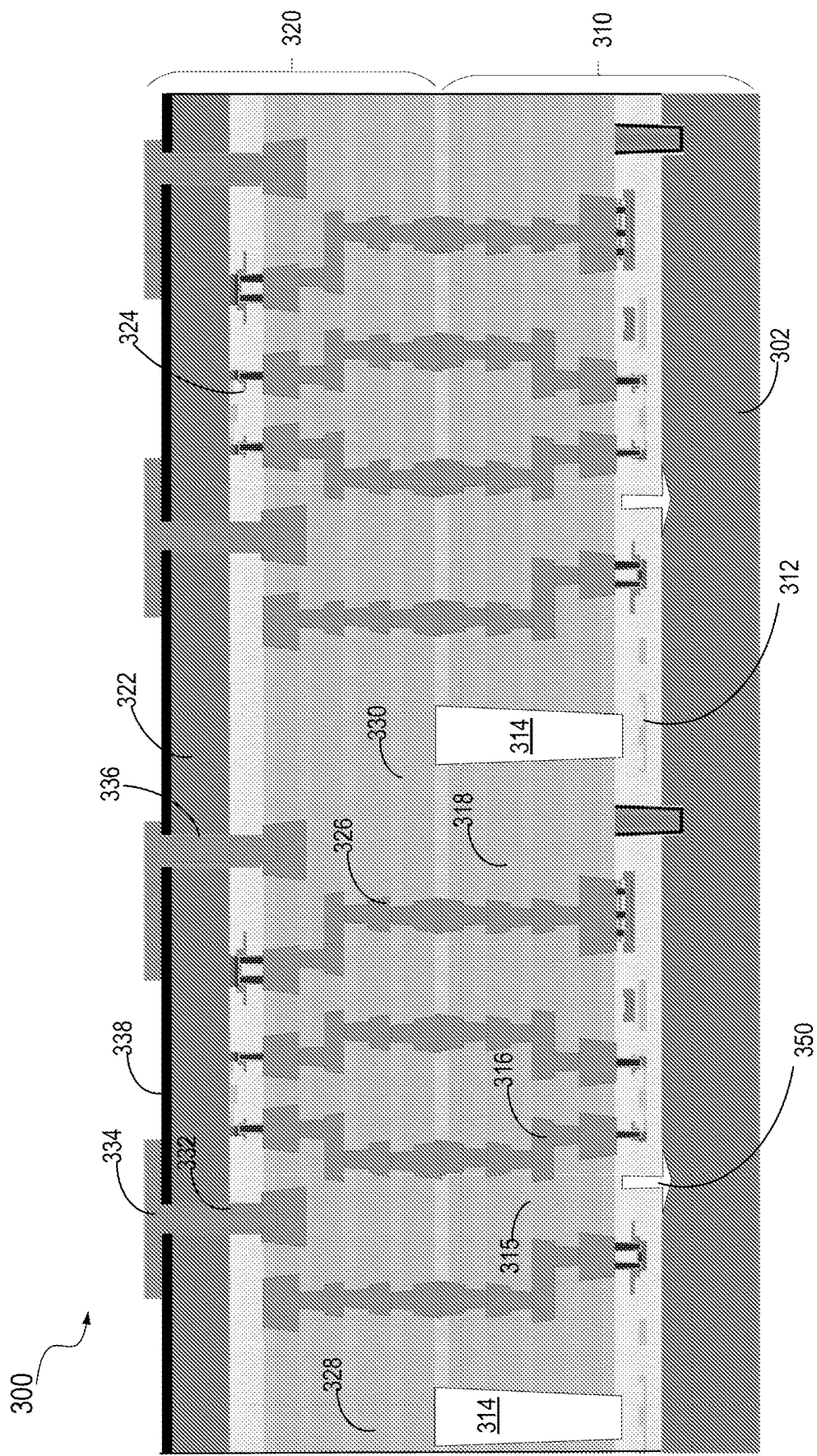
FIG. 3 illustrates an example of a wafer stack including an EIC wafer and a PIC wafer according to certain embodiments.

FIG. 3 illustrates an example of a wafer stack 300 including an EIC wafer 320 and a PIC wafer 310 according to certain embodiments. It is noted that FIG. 3 may not be drawn to scale. As described above, PIC wafer 310 may include a substrate 302 and photonic integrated circuits fabricated on substrate 302. The photonic integrated circuits may include a plurality of grating couplers 312. One or more metal layers 316 may be formed on the photonic integrated circuits. Each metal layer 316 may be formed by, for example, depositing a dielectric layer 318 (e.g., $SiO_2$), patterning dielectric layer 318, depositing metal layer 316 on dielectric layer 318, and patterning metal layer 316. In some embodiments, an etch stop layer 315 (e.g., a SiN layer) may be formed on a metal layer 316 before a dielectric layer 318 is deposited on metal layer 316 to form the next metal layer. In the example illustrated in FIG. 3, openings 314 are formed in dielectric layers 318 at regions where grating couplers 312 are located. In some embodiments, thermal isolation structures 350 may be formed in PIC wafer 310 to isolate thermal-generating devices and/or thermal-sensitive devices.

Similarly, EIC wafer 320 may include a thinned substrate 322 and electronic integrated circuits 324 fabricated thereon. One or more metal layers 326 and one or more dielectric layers 328 may be formed on electronic integrated circuits 324 as described above. Etch stop layers 330 (e.g., SiN) may be used to pattern dielectric layers 328. In the illustrated example, EIC wafer 320 may also include TSVs 332 formed in substrate 322 and metal contact pads 334 formed on substrate 322 for external electrical connections. Metal contact pads 334 may include Cu, Ni, Pd, Au, or any combination thereof. A barrier layer 336 may be between substrate 322 and TSVs 332 to isolate the metal material in TSVs 332 from the semiconductor material in substrate 322. A dielectric layer 338 may be between the back surface of substrate 322 and metal contact pads 334 to isolate substrate 322 and metal contact pads 334. Dielectric layer 338 may include, for example, a thin layer of silicon oxide or silicon nitride.

For optical communications between external devices and photonic integrated circuits, optical signals need to be transmitted between the external devices and photonic integrated circuits with sufficient signal strength to be able to detect and discern the optical signals. For example, the optical communication may be made by aiming an optical fiber perpendicularly to grating couplers 312 in PIC wafer 210. A direct optical path to the grating couplers 312 with a low optical loss may be needed to achieve low error rate optical data transfer. The optical path may need to be free of materials that may absorb, reflect, or scatter the optical signal.

As illustrated in FIG. 3, after EIC wafer 320 and PIC wafer 310 are bonded together at the top surface of PIC wafer 310, the materials of EIC wafer 320 may block optical signals from accessing grating couplers 312 in PIC wafer 310. For example, substrate 322, electronic integrated circuits 324, dielectric layers 328, and etch stop layers 330 may significantly attenuate (e.g., absorb, scatter, or reflect) the incoming light from optical fibers. Thus, these EIC materials need to be removed for the optical signals to be coupled into PIC wafer 310 through grating couplers 312.

One technique of removing the EIC materials is to partially dice the EIC wafer using a blade saw. The position of the saw blade cutting into the EIC wafer may be controlled to only remove the unwanted materials in regions that align with grating couplers 312. However, this technique may cause debris generated by the mechanical dicing to land in openings 314 in PIC wafer 310, and may also result in non-uniform dicing depths. Another possible technique to remove the EIC materials is laser drilling, which may also result in debris and other excess materials remaining in openings 314. Laser drilling and mechanical dicing may also damage grating couplers 312 as the drilling or dicing depth may not be precisely controlled.

According to certain embodiments, removing the EIC materials or other semiconductor integrated circuit materials of a wafer stack in the optical paths can be accomplished by patterning a resist mask layer in areas for material removal and removing the materials by etching using the resist mask layer. For example, dry etching may be used to etch thick material layers due to the anisotropic nature of dry etching such that a smaller horizontal area may be etched compared with isotropic wet etching. The different materials may be removed using dissimilar etch steps.

In one example, to improve the yield and the optical coupling efficiency, a multi-step dry etching process is used to etch trenches in selected regions of the EIC/PIC die stack such that light from optical fibers may be delivered to the grating couplers with little or no loss. The multi-step dry etching process may include a first etch step to remove oxides at selected locations on the back side of the EIC wafer that align with the grating couplers, a second etch process (e.g., a Bosch etch process) to remove the silicon substrate in the selected locations of the EIC wafer, and a third etch step (e.g., a low selectivity etching process) to remove the dielectric layers (e.g., $SiO_2$ and SiN) of the EIC/PIC die stack at the selected regions (e.g., using a SiN layer as the etch stop layer). Optionally, a fourth etch step may be performed to create large openings in the substrate of the EIC to accommodate the optical fibers. In some embodiments, an oxide deposition step may be performed to form passivation spacers on sidewalls of the etched trenches.

Figure 4:
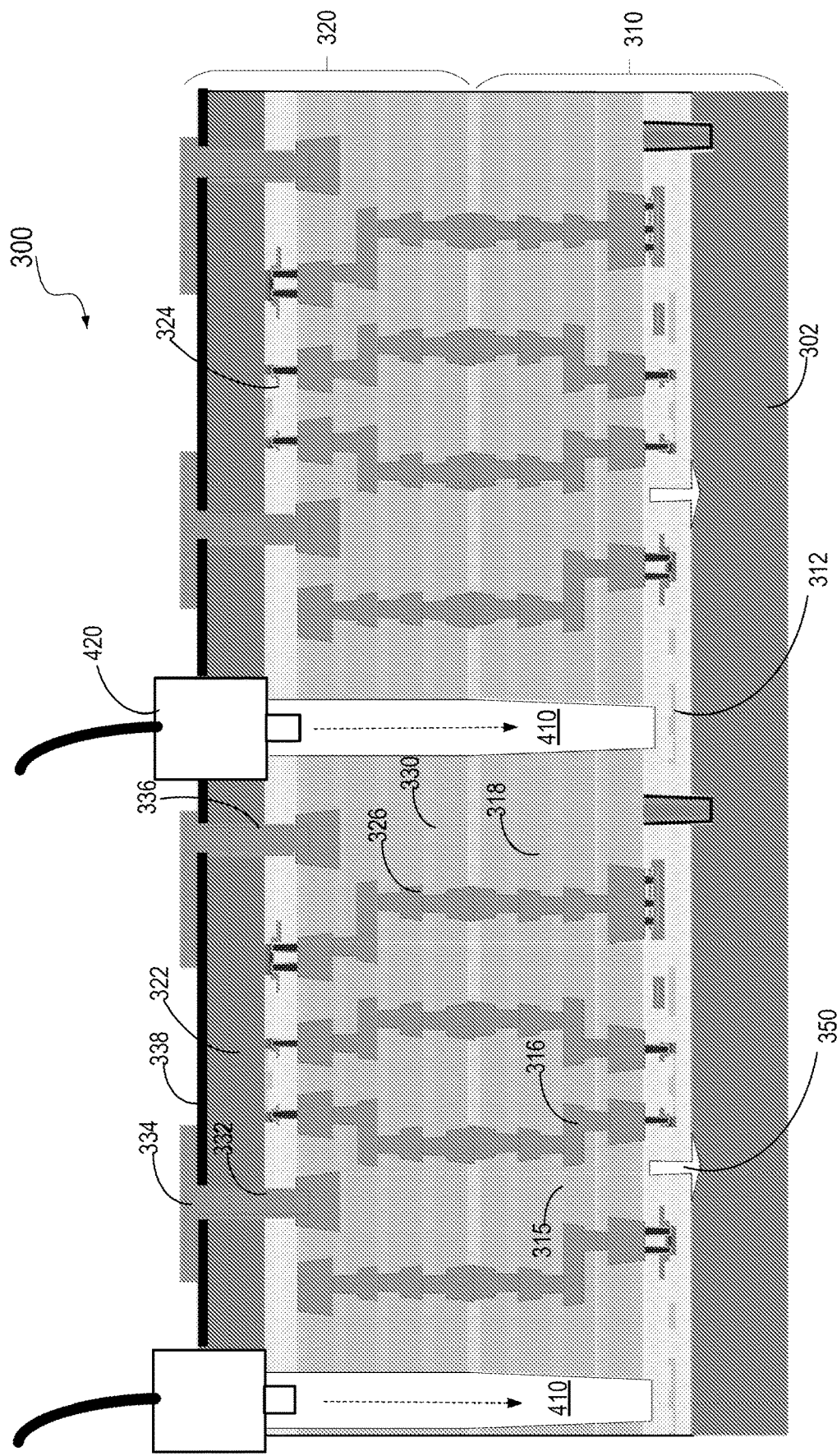
FIG. 4 illustrates an example of a wafer stack including an electronic integrated circuit (EIC) wafer and a photonic integrated circuit (PIC) wafer where semiconductor integrated circuit materials may be removed in certain regions according to certain embodiments.

FIG. 4 illustrates the example of wafer stack 300 including EIC wafer 320 and PIC wafer 310 where semiconductor integrated circuit materials may be removed in certain regions of wafer stack 300 according to certain embodiments. As illustrated, substrate 322, electronic integrated circuits 324, dielectric layers 328, and etch stop layers 330 in regions aligned with grating couplers 312 may be removed by the multi-step dry etching process to form trenches 410 in wafer stack 300. Trenches 410 may have a large aspect ratio (height vs. width, ranging between about 1:1 to about 3:1), and thus debris (if any) in the bottoms of trenches 410 may be difficult to remove. As such, a process that can reduce or eliminate the remaining debris in trenches 410 as disclosed herein may be needed to form trenches 410. Optical fibers 420 may be at least partially inserted into trenches 410, where light output from optical fibers 420 may travel in free space to reach grating couplers 312.

Figure 5:
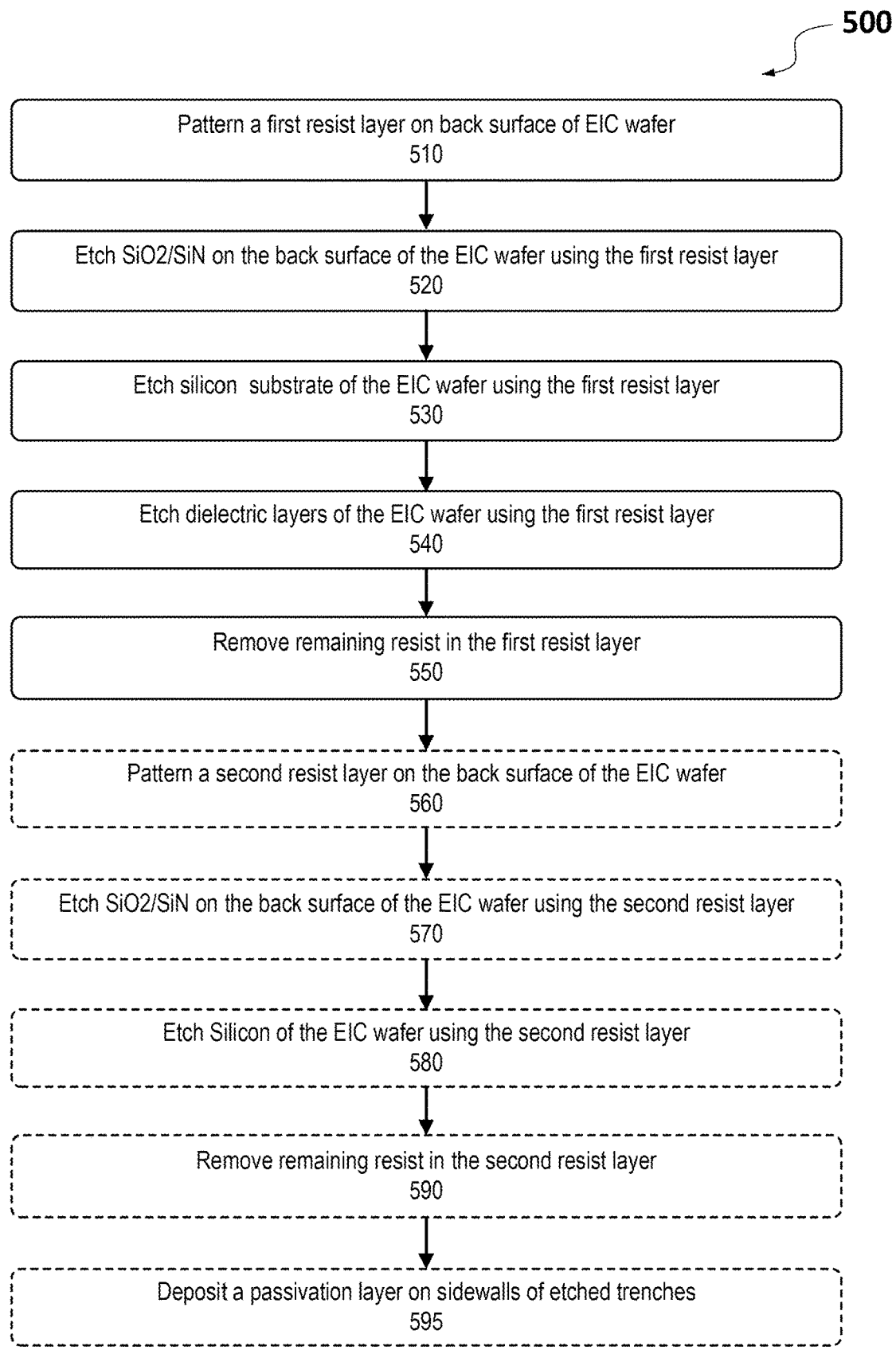
FIG. 5 includes a flowchart illustrating an example of a process for removing semiconductor integrated circuit materials in a wafer stack to gain optical signal access to a photonic integrated circuit according to certain embodiments.

FIG. 5 includes a flowchart 500 illustrating an example of a process for removing semiconductor integrated circuit materials in a wafer stack to gain optical signal access to a photonic integrated circuit (e.g., a grating coupler) according to certain embodiments. It should be appreciated that the specific operations illustrated in FIG. 5 provide a particular process of removing semiconductor integrated circuit materials (e.g., EIC materials) in an EIC wafer bonded to a PIC wafer. Other sequences of steps may also be performed according to alternative embodiments. For example, alternative embodiments may perform the operations outlined above in a different order. Moreover, the individual operations illustrated in FIG. 5 may include multiple sub-steps that may be performed in various sequences as appropriate to the individual operation. Furthermore, additional operations may be added or some operations may not need to be performed, depending on the particular applications. For example, in some embodiments, operations at blocks 560-595 may be optional. One of ordinary skill in the art would recognize many variations, modifications, and alternatives.

FIGS. 6A-6J illustrate examples of results after certain operations of the process for removing semiconductor integrated circuit materials in a wafer stack to gain optical signal access to the photonic integrated circuit shown in FIG. 5 according to certain embodiments. FIGS. 6A-6J are for illustration purposes and are not intended to limit the scope of the present disclosure to the specific examples illustrated. In addition, FIGS. 6A-6J may not be drawn to scale and may only show a portion of the bonded wafer stack.

Operations in block 510 of flowchart 500 may include coating a first resist layer on the back surface of an EIC wafer that is bonded to a PIC wafer, and then patterning the first resist layer using a mask in a lithography process. As described above, the back side of the EIC wafer facing away from the PIC wafer may have metal contact pads formed thereon for external electrical connections. The metal contact pads may have a height of a few microns, and may include layers of metal materials, such as various combinations of Cu, Ni, Pd, and Au layers. The first resist layer may need to have a sufficient thickness to cover and protect the topography of the metal contact pads, and also to maintain coverage and protection of the metal contact pads through the sequence of etching steps. In one example, the first resist layer may have a thickness greater than about 20 µm. The first resist layer may include, for example, a positive resist material, where regions of the first resist layer that are on top of the grating couplers (e.g., grating couplers 312) may be exposed to light or e-beams through the mask and may be removed after a development process.

Figure 6B:
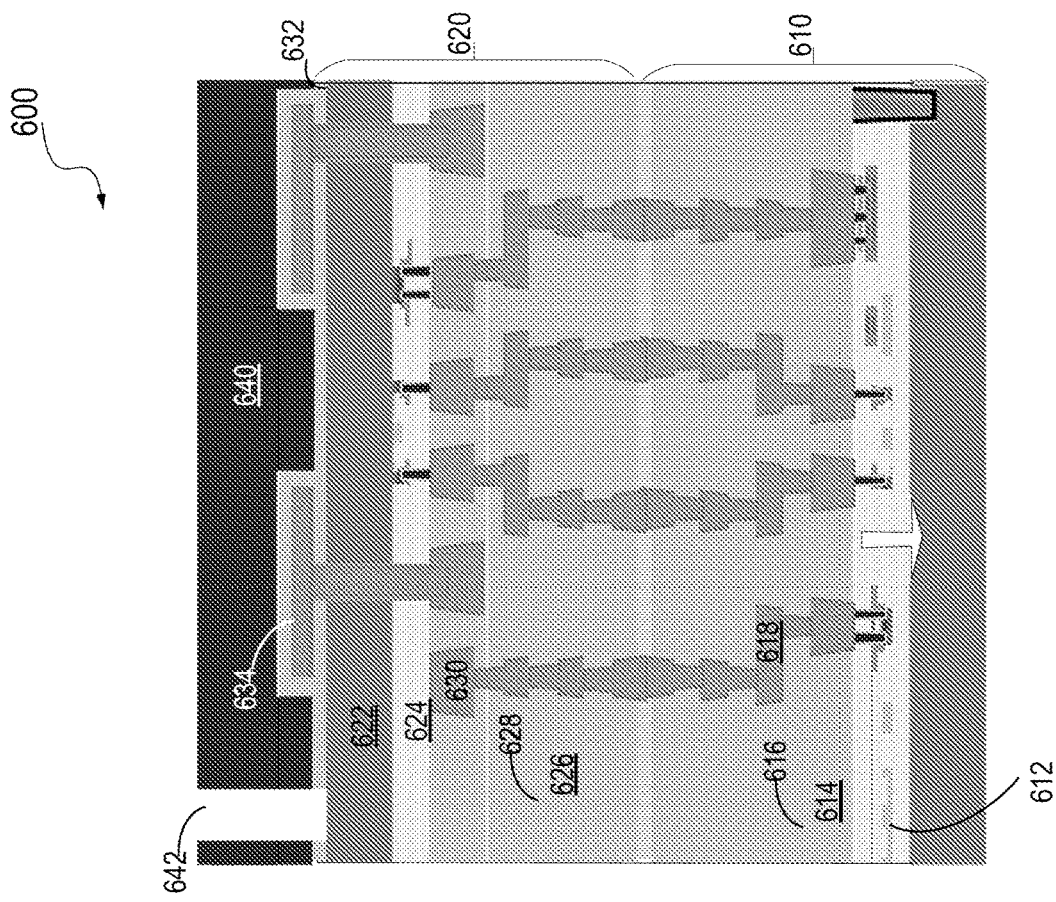
Figure 6A:
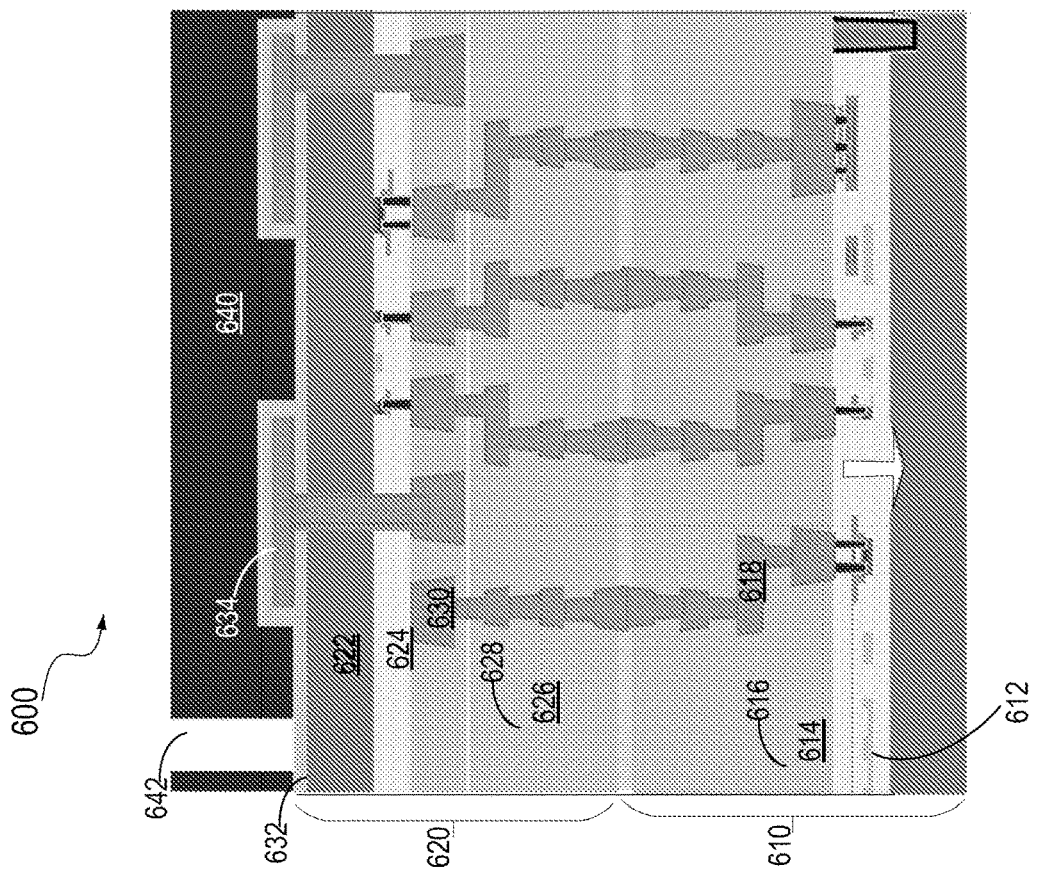

FIG. 6A illustrates an example of wafer stack 600 including an EIC wafer 620 bonded to a PIC wafer 610 and a patterned first resist layer 640 on the back surface of EIC wafer 620 according to certain embodiments. EIC wafer 620 may be similar to EIC wafer 320 described above, and PIC wafer 610 may be similar to PIC wafer 310 described above. As illustrated in the example, PIC wafer 610 may include grating couplers 612, a plurality of dielectric layers 614, and a plurality of metal layers 618 formed thereon. PIC wafer 610 may also include a plurality of etch stop layers 616. EIC wafer 620 may include a substrate 622, electronic integrated circuits 624, a plurality of dielectric layers 626, and a plurality of metal layers 630 formed thereon. EIC wafer 620 may also include a plurality of etch stop layers 628. Metal contact pads 634 may be formed on the back surface of EIC wafer 620. A dielectric layer 632 may be between metal contact pads 634 and substrate 622 of EIC wafer 620.

As shown in FIG. 6A, a first resist layer 640 may be coated on the back surface of EIC wafer 620, and may cover metal contact pads 634 and have a thickness that can protect metal contact pads 634 during the subsequent etching steps. Regions 642 of first resist layer 640 on top of grating couplers 612 may be exposed to light (e.g., UV or EUV light) or e-beams and may be removed after the exposure by a development process. The regions of EIC wafer 620 and PIC wafer 610 on top of grating couplers 612 may not include any metals (e.g., copper) that may make etching impractical since copper is difficult to etch. Materials to be removed in the regions may include semiconductor (e.g.,
silicon) and dielectrics. In some cases, the density of the openings to be etched may not be sufficiently high to give a strong optical signal during dry plasma etching for determining when the materials to be removed have been etched. Thus, additional open patterns (in addition to regions 642 that align with grating couplers 612) may be formed in other locations of first resist layer 640 for forming additional openings in the wafer stack, in order to create a strong signal for endpoint control during the etching.

At block 520, a dielectric layer (e.g., a $SiO_2$ and/or SiN layer) on the back surface of the EIC wafer may be etched using the first resist layer as the etch mask in a first etch process. The dielectric layer may be dielectric layer 632 that is used to isolate metal contact pads 634 from the semiconductor material in substrate 622. The dielectric layer may have a thickness less than about a micron, such as about a few hundred nanometers. The first etch process may remove the oxide or nitride layer using, for example, a fluorine based dry etch. The first etch process may have a selectivity between the dielectric and the resist about, for example 2:1, 3:1, or higher. The etching of the dielectric layer may need to have sufficient over-etching to completely remove the dielectric material (e.g., $SiO_2$ or SiN) on the back surface of the substrate of the EIC wafer. FIG. 6B shows an example result of the operation in block 520. As illustrated, regions of dielectric layer 632 under regions 642 of first resist layer 640 may have been completely removed by the dry etch process.

At block 530, the substrate (e.g., silicon substrate) of the EIC wafer may be etched using the first resist layer as the etch mask. As discussed above, the substrate of the EIC wafer may be thinned by back grinding to less than about 100 µm, such as about 50 µm, but greater than about 25 µm. In order to remove the thick silicon layer, a dry etch process having a selectivity between silicon and resist greater than about 10:1, such as greater than about 20:1, or greater than about 50:1, may be used. In one example, a Bosch dry etch process may be used. The Bosch dry etch process is a high aspect-ratio plasma etching process that alternates between an isotropic etching step and a fluorocarbon-based protection film deposition step by quick gas switching to achieve an anisotropic profile. The etching step may use, for example, $SF_6$ plasma to etch the silicon. The deposition step may create a protection layer on the sidewalls using, for example, $C_4F_8$ plasma. The Bosch dry etch process may have a selectivity between silicon and resist about 50:1, and a selectivity between silicon and oxide greater than about 100:1. Therefore, the dielectric layer (e.g., dielectric layer 632) may need to be completely removed in the first etch step. In addition, the oxide layer (e.g., dielectric layers 626) under the substrate in the EIC wafer may be an etch stop layer for the silicon substrate. FIG. 6C shows an example result of the operation in block 530, where regions of the substrate 622 under regions 642 of first resist layer 640 may have been removed by, for example, the Bosch dry etching process described above.

At block 540, dielectric layers of the EIC wafer and/or the PIC wafer may be etched, again using the first resist layer as the etch mask. The dielectric layers of the EIC wafer and/or the PIC wafer need to be removed in order to reduce the optical loss in the optical path to the grating couplers. The dielectric layers of the EIC wafer and the PIC wafer may have a total thickness between a few microns and tens of microns. In one example, a fluorine based dry etch process similar to the first etch step may be used to remove the dielectric layers. As described above, the fluorine based dry etch process may have an etch selectivity between the dielectric and the first resist layer about 2:1 or higher.

As described above, the dielectric layers of the EIC wafer and/or the PIC wafer above the grating coupler may include one or more etch stop layers (e.g., a silicon nitride layer) that may be used to slow the etch sufficiently to control the etch depth at a desired distance from the grating couplers. Silicon nitride compounds may be etched significantly slower compared to silicon oxide and other non-silicon-nitride dielectrics in certain dry etch chemistries in a high-selectivity etch, and thus may stop or slow down the etching.

In examples where layers of silicon nitride or similar compounds exist throughout the thickness of the dielectric layers, the dielectric layers may be etched using a low selectivity etch chemistry that may etch the silicon oxide layers and the silicon nitride layers at a similar rate, until the dielectric layers above the final silicon nitride etch stop layer is removed. Subsequently, an etch chemistry having a high selectivity between silicon nitride and silicon oxide may be used to etch the final silicon nitride etch stop layer and achieve a controlled etch landing. The point at which to change the etch chemistry may be determined, for example, by characterizing the amount of time for the etch to reach the point, or based on an optical endpoint signal if there is sufficient open area to produce a sufficiently strong optical endpoint signal as described above. If additional materials need to be removed after the etch lands on the silicon nitride etch stop layer, the additional material may be removed by a process with a more precise control in order to stop the etching at a specific distance from the grating couplers, thereby achieving an improved uniformity across the wafer.

Figure 6D:
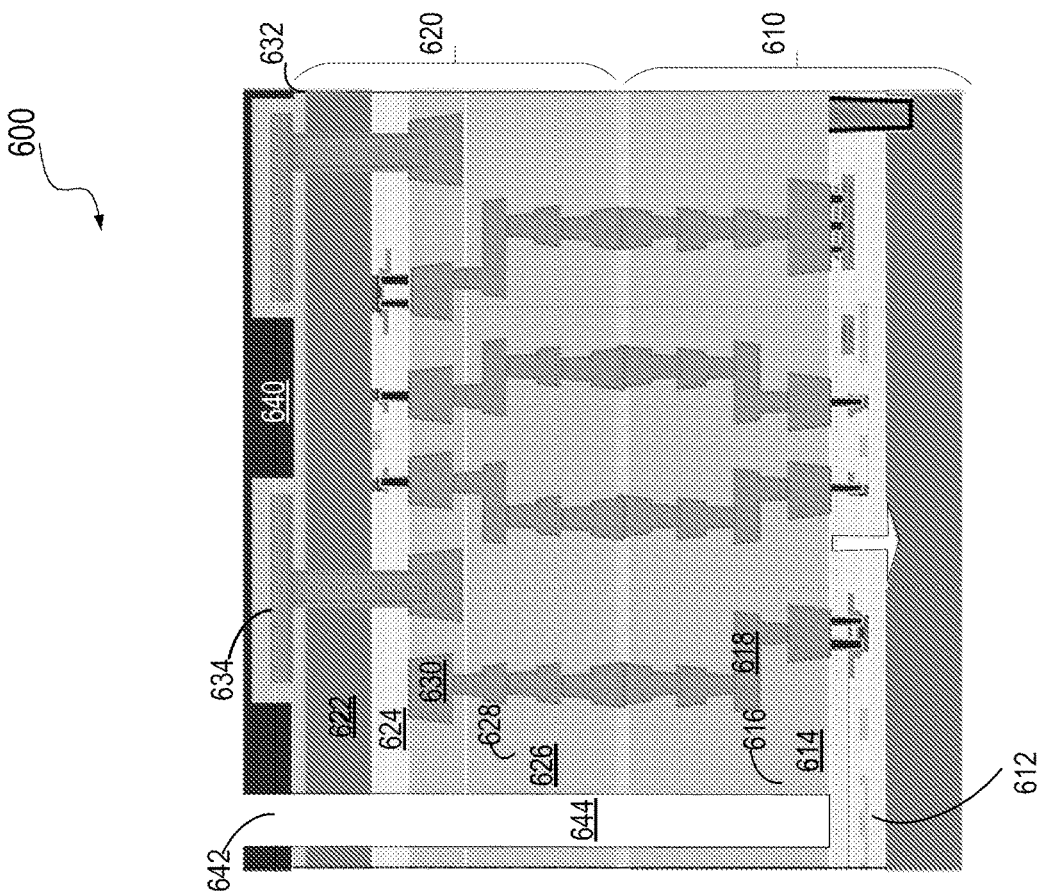
Figure 6C:
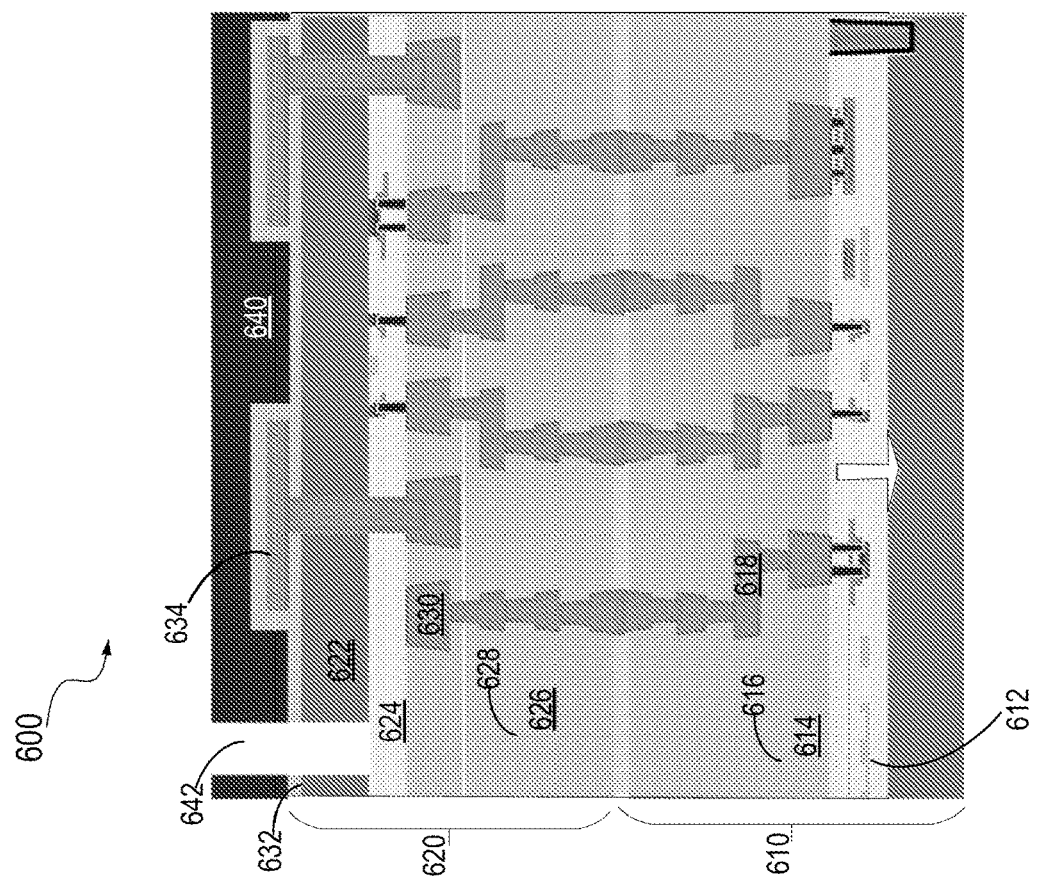

FIG. 6D shows an example of the result after the operation in block 540, where regions of wafer stack 600 under regions 642 of first resist layer 640 may have been removed by the etching process described above with respect to block 540. FIG. 6D shows that trenches 644 with high aspect ratios (e.g., greater than about 10:1 or greater than about 20:1) may be formed in EIC wafer 620 and PIC wafer 610 of wafer stack 600. Trenches 644 may have a depth greater than about 25 μm, greater than about 50 μm, or greater than about 60 μm. Each trench 644 may have a lateral area about one time to about two times of the lateral area of the corresponding grating coupler. The lateral area of the grating coupler may range from, for example, about 40×40 μm² to about 100×100 μm². Trenches 644 may end at the dielectric layer (e.g., $SiO_2$ layer) within which grating couplers 612 may be formed. As also shown in FIG. 6D, the thickness of first resist layer 640 may be significantly reduced after the three etching processes that remove dielectric layer 632, substrate 622 of EIC wafer 620, and the dielectric layers at the selected regions defined by the patterned first resist layer 640. However, there may still be resist materials left on top of metal contact pads 634.

At block 550, the remaining resist material in the first resist layer may be removed. After completing the three etching steps described above with respect to blocks 520-540 of FIG. 5, the remaining resist would need to be removed without damaging any of the dielectric layers, especially if any layer of the dielectric layers has a low-k dielectric material. In one example, a plasma dry strip process may be performed to remove the resist, followed by a wet strip to remove polymer that was formed during the etch processes. FIG. 6E shows an example where the first resist layer 640 has been removed from the top of wafer stack 600.

After trenches (e.g., trenches 644) to access grating couplers 612 are formed by the etching processes described above, wider openings in substrate 622 of EIC wafer 620 may be created to accommodate the optical fiber connection. The wider openings in substrate 622 may be fabricated by performing the same operations described above with respect to block 530 of flowchart 500, but using an etch mask having wider openings that are aligned with trenches 644.

At block 560 of flowchart 500, a second resist layer may be deposited on the back surface of the EIC wafer, and may then be patterned using a mask and a lithography process as described above. The resist may also be deposited on the bottom surfaces of the trenches (e.g., trenches 644) in order to prevent etching of the bottom of the trenches in the subsequent etching steps. The second resist layer may be patterned to have wider openings in regions where high aspect ratio trenches 644 are located.

FIG. 6F shows that a second resist layer 650 has been deposited on the top of wafer stack 600. Second resist layer 650 may cover metal contact pads 634 and may have a sufficiently high thickness to prevent metal contact pads 634 from being etched. As illustrated in FIG. 6F, resist 652 may be deposited on the bottom surfaces of trenches 644. Resist 652 may have a sufficiently high thickness to prevent grating couplers 612 from being etched.

Figures 6G, 6H:
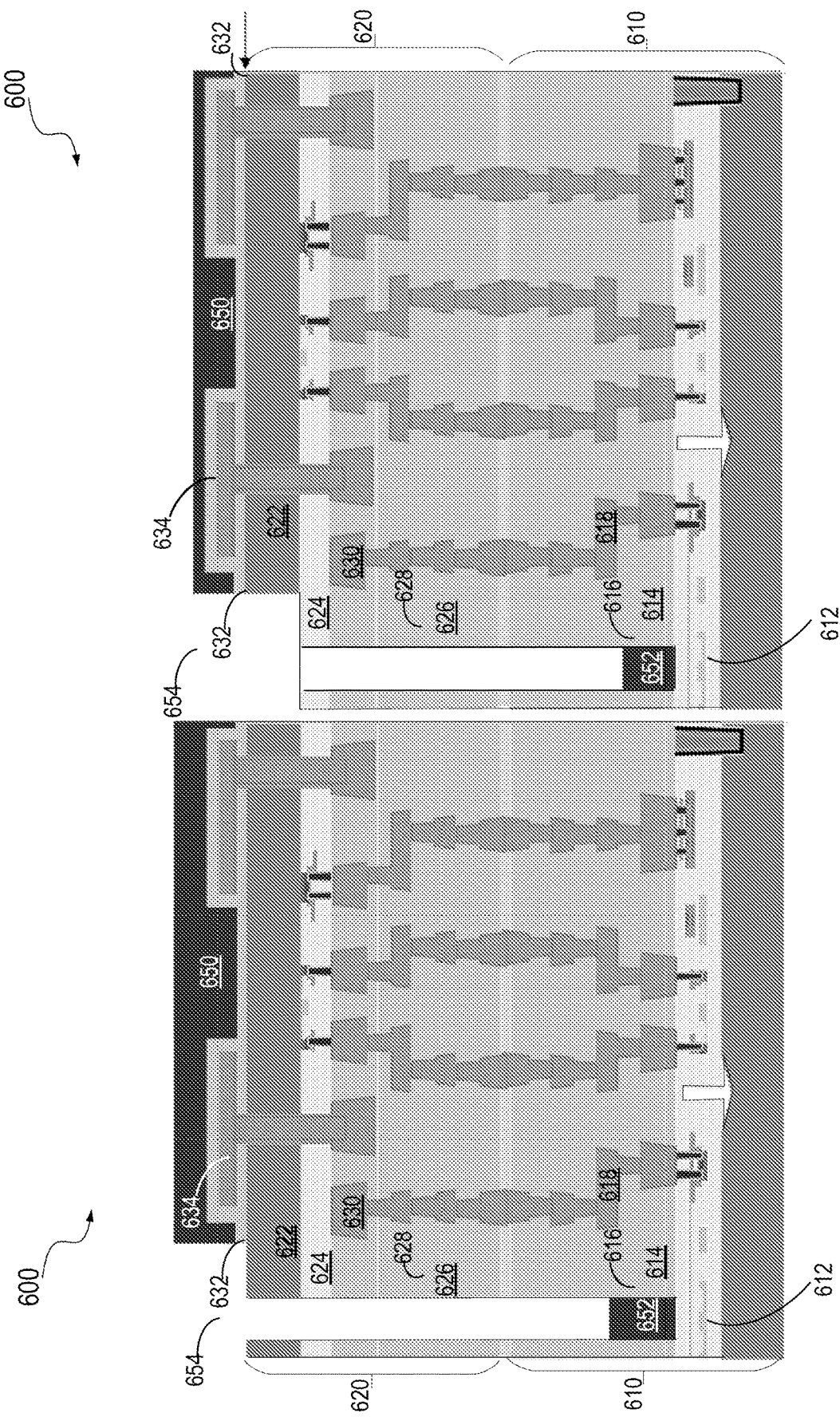

At block 570, the dielectric layer (e.g., $SiO_2$ or SiN) on the back surface of the EIC wafer under the wider openings of the second resist layer may be etched using the second resist layer as the etch mask. The etch process may be similar to the etching process described above with respect to the operations in block 520. FIG. 6G shows an example of the result of the operations in block 570. FIG. 6G shows that dielectric layer 632 under the wider openings 654 in second resist layer 650 has been removed by the etching process.

At block 580, the substrate (e.g., silicon) of the EIC wafer under the wider openings of the second resist layer may be etched using the second resist layer as the etch mask. The etching process in block 580 may be similar to the etching process described above with respect to block 530. For example, the Bosch dry etch process that alternates between an isotropic etching step and a fluorocarbon-based protection film deposition step by quick gas switching may be used to anisotropically etch the substrate of the EIC wafer, where the etching step may use, for example, $SF_6$ plasma to etch silicon, while the deposition step may create a protection layer on the sidewalls using, for example, $C_4F_8$ plasma. FIG. 6H shows an example of the result of the operations in block 580. FIG. 6H shows that substrate 622 of EIC wafer 620 under the wider openings 654 of second resist layer 650 may be removed by the etching.

Figure 6I:
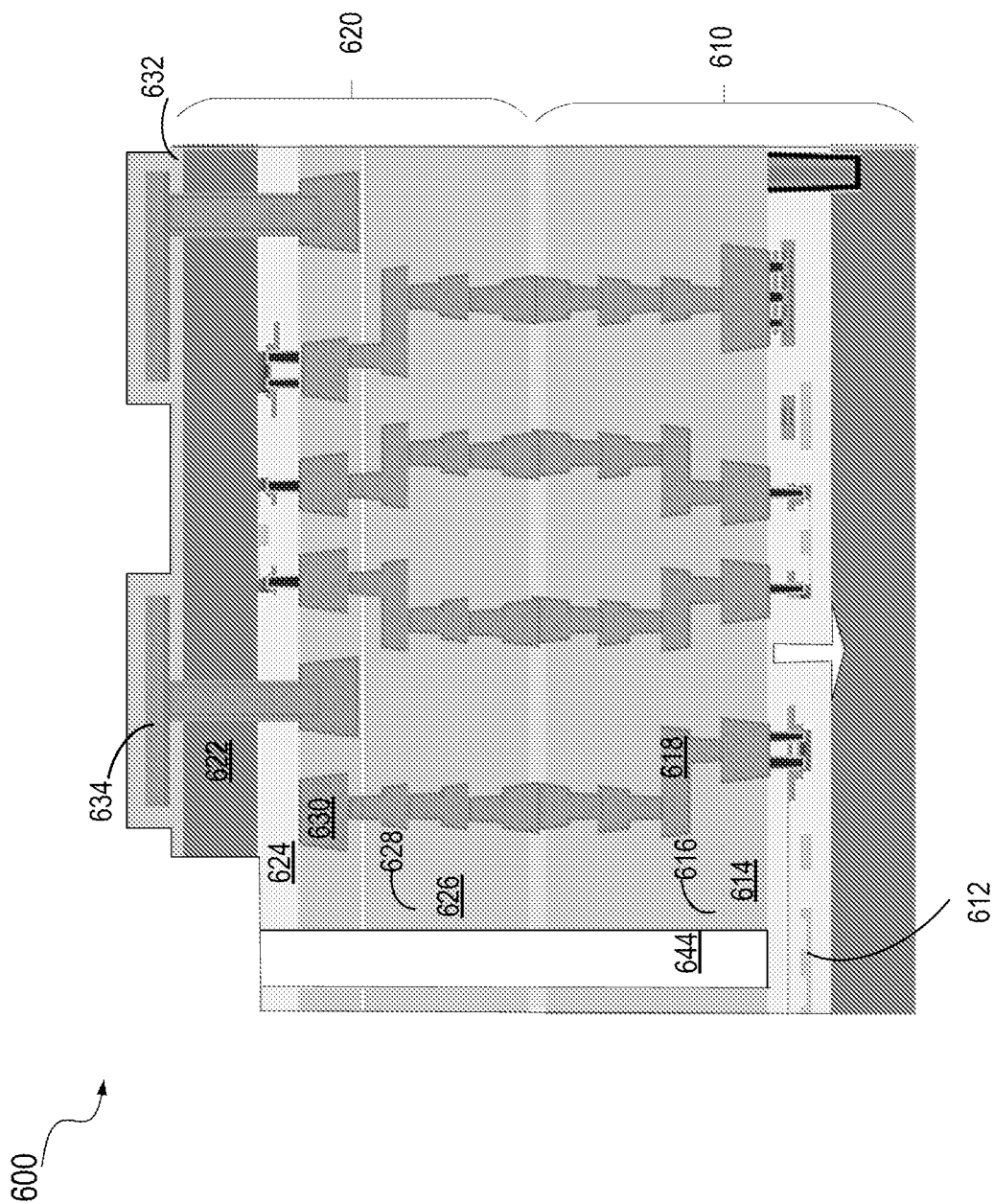

At block 590 of flowchart 500, the remaining resist of the second resist layer may be removed. The operations at block 590 may be similar to the operations at block 550. For example, a plasma dry strip process may be performed to remove the resist, followed by a wet strip to remove polymer that was formed during the etch process. The remaining resist on the bottom surfaces of trenches may also be removed by the operations at block 590. FIG. 6I shows an example of the result of the operations in block 590. FIG. 6I shows that the remaining resist of second resist layer 650 has been removed. The remaining resist 652 at the bottom surfaces of trenches 644 has been removed as well.

At block 595, a passivation layer may be deposited on sidewalls of the etched trenches and the back surface of the EIC wafer. The passivation layer may include, for example, $SiO_2$, and may be conformally deposited on surfaces of the structure formed after operations at block 590 using, for example, chemical vapor deposition (CVD) or atomic layer deposition (ALD) techniques. The passivation layer may provide electrical isolation and help to reduce the roughness of the sidewalls of the trenches. In some embodiments, the passivation layer may be selectively etched to expose the metal contact pads for connecting to other circuits, such as an electrical backplane.

Figure 6J:
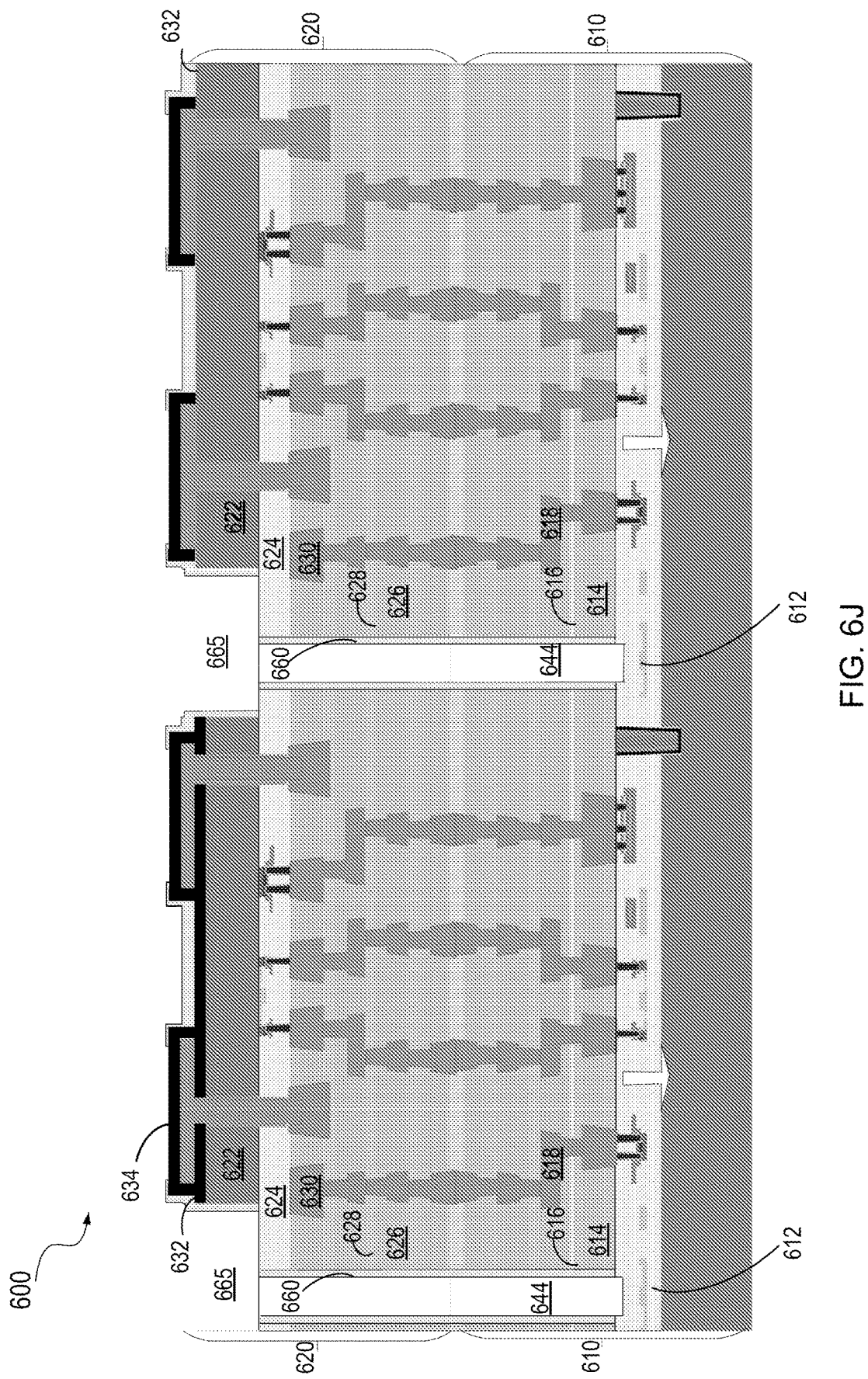

FIG. 6J shows an example of the result of the operations in block 595. FIG. 6J shows that a $SiO_2$ passivation layer 660 may be conformally deposited on the sidewalls of trenches 644 and the top surface of wafer stack 600. Passivation layer 660 has been selectively etched to expose metal contact pads 634 for connecting to other circuits, such as an electrical backplane, using, for example, wire bonding. FIG. 6J also shows the high-aspect ratio (e.g., >10:1) trenches 644 formed in wafer stack 600 for light to pass through and reach grating couplers 612. FIG. 6J also shows wider openings 665 at the top of wafer stack 600. As described above, wider openings 665 may be used to accommodate optical fibers.

FIGS. 7A-7C illustrate another example of a process for removing semiconductor integrated circuit materials in a wafer stack to gain optical signal access to a photonic integrated circuit according to certain embodiments. FIG. 7A shows an EIC wafer 720 and a PIC wafer 710 before the wafer bonding. FIG. 7B shows a wafer stack 700 that includes EIC wafer 720 and PIC wafer 710 bonded together using, for example, wafer-to-wafer hybrid bonding. FIG. 7C shows wafer stack 700 with trenches formed therein for accessing the grating couplers according to certain embodiments.

In the example shown by FIGS. 7A-7C, before wafer bonding, trenches 712 may have been etched in a first dielectric layer stack 714 of PIC wafer 710, where a grating coupler may be optically accessed through trench 712. But EIC wafer 720 may not have trenches etched in a second dielectric layer stack 724 of EIC wafer 720. EIC wafer 720 may be flipped and bonded to PIC wafer 710 such that the top surface of EIC wafer 720 may be bonded to the top surface of PIC wafer 710. After the wafer bonding, substrate 722 may be thinned by, for example, back grinding. TSVs 726 may then be formed in substrate 722, and metal contact pads 728 may be formed on the back surface of substrate 722. A multi-step etching process as described above with respect to FIGS. 5-6E may then be performed to remove substrate 722 and second dielectric layer stack 724 of EIC wafer 720 in regions aligned with trenches 712 to form trenches 702 for accessing the grating coupler. Although not shown in FIG. 7C, addition processes as described above with respect to blocks 560-595 and FIGS. 6F-6J may be performed to form wider openings in substrate 722 and a passivation layer on sidewalls of trenches 702.

Figure 8A:
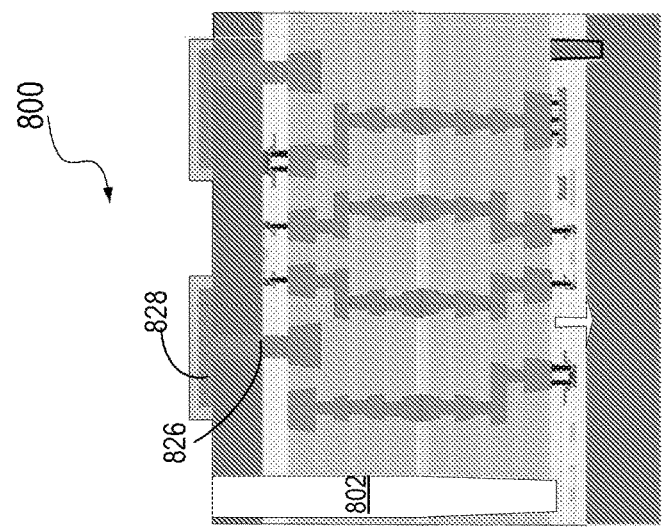
FIGS. 8A-8C illustrate an example of a process for removing semiconductor integrated circuit materials in a wafer stack to gain optical signal access to a photonic integrated circuit according to certain embodiments.
Figure 8B:
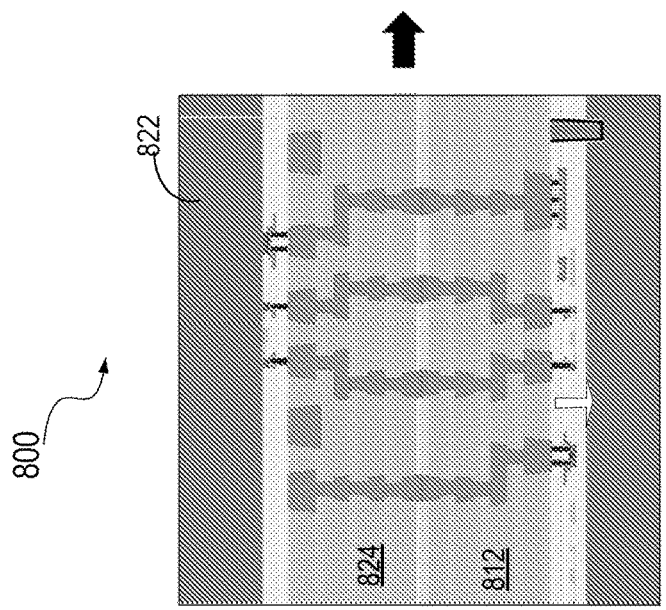
Figure 8C:
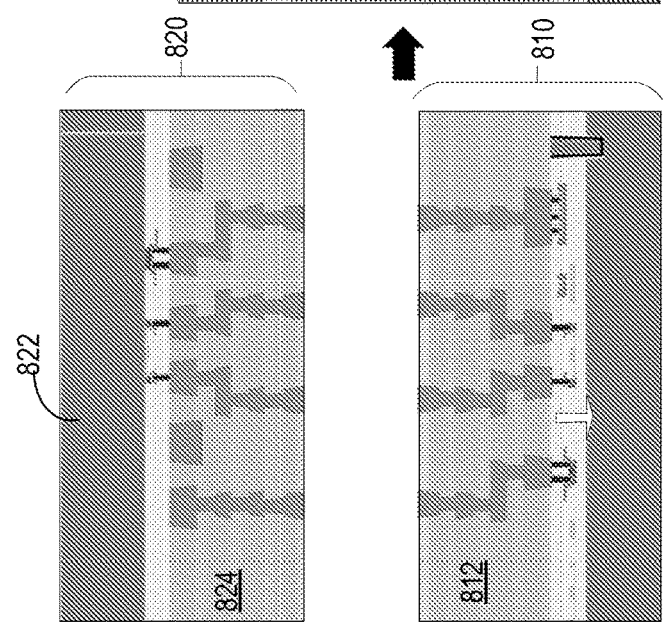

FIGS. 8A-8C illustrate an example of a process for removing semiconductor integrated circuit materials in a wafer stack to gain optical signal access to a photonic integrated circuit according to certain embodiments. FIG. 8A shows an EIC wafer 820 and a PIC wafer 810 before the wafer bonding. FIG. 8B shows a wafer stack 800 that includes EIC wafer 820 and PIC wafer 810 bonded together using, for example, wafer-to-wafer hybrid bonding. FIG. 8C shows wafer stack 800 with trenches formed therein for accessing the grating couplers according to certain embodiments.

In the example shown by FIGS. 8A-8C, before wafer bonding, PIC wafer 810 may not have trenches etched in a first dielectric layer stack 812 of PIC wafer 810 for optical access of the grating coupler in PIC wafer 810. EIC wafer 820 may not have trenches etched in a second dielectric layer stack 824 of EIC wafer 820 either. EIC wafer 820 may be flipped and bonded to PIC wafer 810 such that the top surface of EIC wafer 820 may be bonded to the top surface of PIC wafer 810. After the wafer bonding, substrate 822 may be thinned by, for example, back grinding. TSVs 826 may then be formed in substrate 822, and metal contact pads 828 may be formed on the back surface of substrate 822. A multi-step etching process as described above with respect to FIGS. 5-6E may then be performed to remove substrate 822, second dielectric layer stack 824 of EIC wafer 820, and first dielectric layer stack 812 of PIC wafer 810 in regions aligned with grating couplers to form trenches 802 for accessing the grating couplers. Although not shown in FIG. 8C, addition processes as described above with respect to blocks 560-595 and FIGS. 6F-6J may be performed to form wider openings in substrate 822 and a passivation layer on sidewalls of trenches 802.

Figures 9A, 9B, 9C:
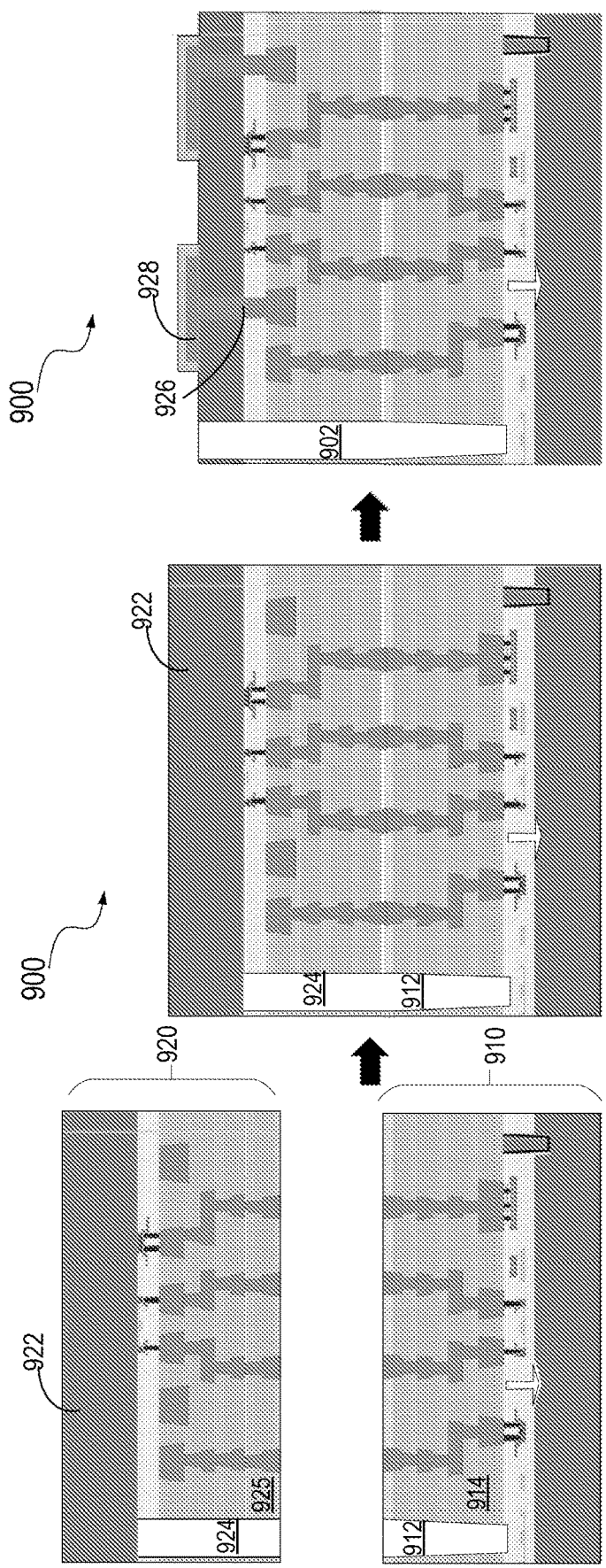
FIGS. 9A-9C illustrate an example of a process for removing semiconductor integrated circuit materials in a wafer stack to gain optical signal access to a photonic integrated circuit according to certain embodiments.

FIGS. 9A-9C illustrate an example of a process for removing semiconductor integrated circuit materials in a wafer stack to gain optical signal access to a photonic integrated circuit according to certain embodiments. FIG. 9A shows an EIC wafer 920 and a PIC wafer 910 before the wafer bonding. FIG. 9B shows a wafer stack 900 that includes EIC wafer 920 and PIC wafer 910 bonded together using, for example, wafer-to-wafer hybrid bonding. FIG. 9C shows wafer stack 900 with trenches formed therein for accessing the grating couplers according to certain embodiments.

In the example shown by FIGS. 9A-9C, before wafer bonding, trenches 912 may have been etched in a first dielectric layer stack 914 of PIC wafer 910, where a grating coupler may be optically accessed through trench 912. EIC wafer 920 may also have trenches 924 etched in a second dielectric layer stack 925 of EIC wafer 920. EIC wafer 920 may be flipped and bonded to PIC wafer 910 such that the top surface of EIC wafer 920 may be bonded to the top surface of PIC wafer 910. After the wafer bonding, substrate 922 may be thinned by, for example, back grinding. TSVs 926 may then be formed in substrate 922, and metal contact pads 928 may be formed on the back surface of substrate 922. A multi-step etching process as described above with respect to FIGS. 5-6E may then be performed to remove substrate 922 in regions aligned with trenches 912 and 924 to form trenches 902 for accessing the grating coupler. Although not shown in FIG. 9C, addition processes as described above with respect to blocks 560-595 and FIGS. 6F-6J may be performed to form wider openings in substrate 922 and a passivation layer on sidewalls of trenches 902.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/ or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "and/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A device comprising:
    a photonic integrated circuit (PIC) die including:
        a waveguide layer including a waveguide and a grating coupler configured to couple incident light into the waveguide; and
        a first set of dielectric layers on the waveguide layer; and
    an electronic integrated circuit (EIC) die bonded to the PIC die, the EIC die including:
        a semiconductor substrate; and
        a second set of dielectric layers on the semiconductor substrate;
    wherein the first set of dielectric layers faces the second set of dielectric layers; and
    wherein the PIC die and the EIC die include a trench aligned with the grating coupler, the trench extending through the semiconductor substrate, the second set of dielectric layers, and the first set of dielectric layers to the waveguide layer such that the incident light passes through the trench to reach the grating coupler.

2. The device of claim 1, further comprising a dielectric layer on sidewalls of the trench.

3. The device of claim 1, wherein the trench includes a wider portion in the semiconductor substrate.

4. The device of claim 1, wherein the EIC die comprises:
    a plurality of through-silicon vias (TSVs) in the semiconductor substrate; and
    a plurality of metal contact pads on the semiconductor substrate and facing away from the PIC die, the plurality of metal contact pads coupled to the plurality of TSVs.

5. The device of claim 4, wherein the EIC die comprises a dielectric layer between the semiconductor substrate and the plurality of metal contact pads.

6. The device of claim 1, wherein the trench is characterized by an aspect ratio between 1:1 and 3:1.

7. The device of claim 1, wherein the trench is characterized by a lateral area between one time and two times of a lateral area of the grating coupler, and wherein the lateral area of the grating coupler is between 40×40 µm² and 100×100 µm².

8. The device of claim 1, wherein the trench is characterized by a depth greater than 50 µm.

9. The device of claim 1, wherein the first set of dielectric layers includes an etch stop layer for oxide etching.

10. The device of claim 1, wherein the second set of dielectric layers includes an etch stop layer for oxide etching.

11. The device of claim 1, further comprises an optical fiber in at least a portion of the trench.

12. A method comprising:
obtaining a wafer stack including a photonic integrated circuit (PIC) wafer and an electronic integrated circuit (EIC) wafer, wherein:
the PIC wafer includes:
a waveguide layer including a waveguide and a grating coupler configured to couple incident light into the waveguide; and
a first set of dielectric layers on the waveguide layer;
the EIC wafer includes:
a semiconductor substrate;
a first dielectric layer on a first side of the semiconductor substrate; and
a second set of dielectric layers on a second side of the semiconductor substrate; and
the first set of dielectric layers is bonded to the second set of dielectric layers;
forming a first patterned etch mask layer on the first side of the semiconductor substrate, the first patterned etch mask layer including a first opening aligned with the grating coupler;
etching, using the first patterned etch mask layer in a first etching process, a region of the first dielectric layer under the first opening;
etching, using the first patterned etch mask layer in a second etching process, a region of the semiconductor substrate under the first opening; and
etching, using the first patterned etch mask layer in a third etching process, a region of the second set of dielectric layers under the first opening to form a trench in the first dielectric layer, the semiconductor substrate, and the second set of dielectric layers under the first opening.

13. The method of claim 12, further comprising etching, using the first patterned etch mask layer in the third etching process, a region of the first set of dielectric layers under the first opening until the trench reaches an etch stop layer in the first set of dielectric layers.

14. The method of claim 13, further comprising etching, using the first patterned etch mask layer in a fourth etching process, a region of the etch stop layer under the first opening.

15. The method of claim 13, wherein the etch stop layer includes a silicon nitride layer.

16. The method of claim 12, wherein the second etching process is characterized by an etch selectivity between silicon and silicon dioxide greater than 20:1.

17. The method of claim 12, wherein the second etching process comprises a Bosch etching process.

18. The method of claim 12, wherein the semiconductor substrate is characterized by a thickness greater than 25 µm.

19. The method of claim 12, wherein the first etching process, the second etching process, and the third etching process each include a chemically assisted plasma etching process.

20. The method of claim 12, further comprising:
forming a second patterned etch mask layer on the first side of the semiconductor substrate, the second patterned etch mask layer including a second opening that is aligned with the grating coupler and is wider than the first opening;
etching, using the second patterned etch mask layer in a fifth etching process, a region of the first dielectric layer under the second opening; and
etching, using the second patterned etch mask layer in a sixth etching process, the semiconductor substrate under the second opening.

21. The method of claim 12, further comprising conformally depositing a second dielectric layer on sidewalls of the trench.

22. The method of claim 12, wherein obtaining the wafer stack comprises:
obtaining the EIC wafer and the PIC wafer;
bonding the EIC wafer and the PIC wafer such that the first set of dielectric layers faces the second set of dielectric layers;
thinning the semiconductor substrate;
forming through-silicon vias in the semiconductor substrate;
forming the first dielectric layer on the first side of the semiconductor substrate; and
forming metal contact pads on the first dielectric layer.

23. The method of claim 22, further comprising, before bonding the EIC wafer and the PIC wafer, removing a region of the first set of dielectric layers on the grating coupler by etching the first set of dielectric layers.

24. A method comprising:
obtaining a wafer stack including a photonic integrated circuit (PIC) wafer and an electronic integrated circuit (EIC) wafer, wherein:
the PIC wafer includes:
a waveguide layer including a waveguide and a grating coupler configured to couple incident light into the waveguide;
a first set of dielectric layers on the waveguide layer; and
a first trench in the first set of dielectric layers and aligned with the grating coupler;
the EIC wafer includes:
a semiconductor substrate;
a first dielectric layer on a first side of the semiconductor substrate;
a second set of dielectric layers on a second side of the semiconductor substrate; and
a second trench in the second set of dielectric layers, wherein the second trench is aligned with the first trench and the grating coupler; and
the first set of dielectric layers is bonded to the second set of dielectric layers;
forming a first patterned etch mask layer on the first side of the semiconductor substrate, the first patterned etch mask layer including a first opening aligned with the grating coupler;
etching, using the first patterned etch mask layer in a first etching process, a region of the first dielectric layer under the first opening; and
etching, using the first patterned etch mask layer in a second etching process, a region of the semiconductor substrate under the first opening.

25. The method of claim 24, further comprising:
forming a second patterned etch mask layer on the first side of the semiconductor substrate, the second patterned etch mask layer including a second opening that is aligned with the grating coupler and is wider than the first opening;

etching, using the second patterned etch mask layer in a third etching process, a region of the first dielectric layer under the second opening; and etching, using the second patterned etch mask layer in a fourth etching process, a region of the semiconductor substrate under the second opening.

26. The method of claim 24, wherein obtaining the wafer stack comprises:

obtaining the EIC wafer and the PIC wafer;

bonding the EIC wafer and the PIC wafer such that the first set of dielectric layers faces the second set of dielectric layers;

thinning the semiconductor substrate;

forming through-silicon vias in the semiconductor substrate;

forming the first dielectric layer on the first side of the semiconductor substrate; and forming metal contact pads on the first dielectric layer.

27. The method of claim 26, further comprising, before bonding the EIC wafer and the PIC wafer:

etching the first set of dielectric layers on the grating coupler to form the first trench; and etching the second set of dielectric layers to form the second trench.

28. The method of claim 24, further comprising conformally depositing a second dielectric layer on sidewalls of the first trench and the second trench.

* * * * *